(12) United States Patent
Murata

(10) Patent No.: US 10,462,127 B2
(45) Date of Patent: Oct. 29, 2019

(54) INFORMATION PROCESSING SYSTEM, INFORMATION PROCESSING DEVICE, AND COMMUNICATION CONNECTION METHOD

(71) Applicant: Sharp Kabushiki Kaisha, Osaka (JP)

(72) Inventor: Ryoji Murata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/823,500

(22) Filed: Nov. 27, 2017

(65) Prior Publication Data

US 2018/0083957 A1 Mar. 22, 2018

Related U.S. Application Data

(63) Continuation of application No. 14/376,768, filed as application No. PCT/JP2013/051952 on Jan. 30, 2013, now abandoned.

(30) Foreign Application Priority Data

Feb. 9, 2012 (JP) ................................. 2012-026630
May 24, 2012 (JP) ................................. 2012-119014

(51) Int. Cl.
*H04L 9/32* (2006.01)
*H04L 29/06* (2006.01)
(Continued)

(52) U.S. Cl.
CPC ........ *H04L 63/0838* (2013.01); *G06F 21/608* (2013.01); *H04N 1/00127* (2013.01);
(Continued)

(58) Field of Classification Search
CPC .............. G06F 21/608; H04L 63/0838; H04N 1/00127; H04N 1/4413; H04N 1/4433; H04N 2201/0094
See application file for complete search history.

(56) References Cited

U.S. PATENT DOCUMENTS 6,772,331 B1 8/2004 Hind
7,418,591 B2 8/2008 Tachikawa
(Continued)

FOREIGN PATENT DOCUMENTS

CN 1777101 A 5/2006
CN 1985227 A 6/2007
(Continued)

OTHER PUBLICATIONS

Xerox. "Xerox® WorkCentre 7120 User Guide", 2010. (Year: 2010).*

(Continued)

*Primary Examiner* — Michael Simitoski
(74) *Attorney, Agent, or Firm* — Renner, Otto, Boisselle & Sklar, LLP

(57) ABSTRACT

The present invention provides, for a connection from an unspecified communication device, an information processing system, information processing device configuring the information processing system, and communication connection method for between the communication device and the information processing device which are capable of securing communication security while simplifying operation in the communication device. In order to send image data to a multi-function device from a communication terminal device in order to print out the same, the multi-function device generates a one-time password that is limited in period of validity to a period related to the printout so as to display the same together with the SSID of the device itself upon a display unit, whereupon at the communication terminal device, the displayed SSID and the one-time password are input so as to make a connection in order to send image data.

5 Claims, 23 Drawing Sheets

(51) Int. Cl.
*H04N 1/00* (2006.01)
*H04N 1/44* (2006.01)
*G06F 21/60* (2013.01)
*G06F 3/12* (2006.01)

(52) U.S. Cl.
CPC ......... *H04N 1/4413* (2013.01); *H04N 1/4433* (2013.01); *H04N 2201/0094* (2013.01)

(56) References Cited

U.S. PATENT DOCUMENTS

| | | | |
|---|---|---|---|
| 7,844,993 B2 | 11/2010 | Yoshizawa | |
| 7,920,534 B2 | 4/2011 | Nakayama | |
| 8,289,890 B2 * | 10/2012 | Murayama | H04W 76/11 370/310 |
| 8,381,270 B1 | 2/2013 | Hsieh | |
| 8,649,297 B2 * | 2/2014 | Ahlers | H04L 41/12 370/252 |
| 8,775,533 B2 * | 7/2014 | Hassan | H04W 12/06 709/206 |
| 8,966,588 B1 * | 2/2015 | Pizot | G06F 21/00 709/208 |
| 9,158,480 B2 * | 10/2015 | Fernandes | G06F 3/1204 |
| 2002/0032703 A1 | 3/2002 | Gassho | |
| 2002/0167690 A1 * | 11/2002 | Fujii | H04N 1/33307 358/539 |
| 2003/0061294 A1 | 3/2003 | Stennicke | |
| 2003/0083996 A1 | 5/2003 | Fischer | |
| 2003/0133090 A1 * | 7/2003 | Kato | G03B 1/00 355/133 |
| 2004/0021889 A1 * | 2/2004 | McAfee | H04N 1/00209 358/1.13 |
| 2004/0054624 A1 | 3/2004 | Guan | |
| 2005/0054342 A1 * | 3/2005 | Otsuka | H04L 63/083 455/426.2 |
| 2005/0148326 A1 * | 7/2005 | Nogawa | H04L 41/0806 455/420 |
| 2005/0226170 A1 | 10/2005 | Relan | |
| 2005/0279835 A1 * | 12/2005 | Groeneboer | H04N 1/00204 235/472.01 |
| 2005/0282531 A1 | 12/2005 | Andreasson | |
| 2006/0104238 A1 | 5/2006 | Hibino | |
| 2006/0200850 A1 | 9/2006 | Yoshizawa | |
| 2006/0208088 A1 | 9/2006 | Sekiguchi | |
| 2006/0282541 A1 * | 12/2006 | Hiroki | G06Q 20/3674 709/228 |
| 2007/0100972 A1 | 5/2007 | Otsuka | |
| 2007/0101403 A1 | 5/2007 | Kubler | |
| 2007/0157024 A1 | 7/2007 | Miller | |
| 2007/0255838 A1 | 11/2007 | Hassan | |
| 2007/0256121 A1 | 11/2007 | Hassan | |
| 2007/0268517 A1 * | 11/2007 | Koarai | G06F 3/1204 358/1.15 |
| 2007/0283157 A1 | 12/2007 | Yami | |
| 2007/0287542 A1 | 12/2007 | Miyazaki | |
| 2008/0077527 A1 | 3/2008 | Choe | |
| 2008/0077717 A1 | 3/2008 | Okutsu | |
| 2008/0081666 A1 | 4/2008 | Masera | |
| 2008/0186536 A1 | 8/2008 | Shimizu | |
| 2008/0298305 A1 | 12/2008 | Nakamura | |
| 2009/0043998 A1 | 2/2009 | Doumuki | |
| 2009/0088077 A1 | 4/2009 | Brown | |
| 2009/0133634 A1 | 5/2009 | Axelsson | |
| 2009/0175495 A1 * | 7/2009 | Kamei | H04N 1/00442 382/100 |
| 2009/0247824 A1 | 10/2009 | Kawasaki | |
| 2009/0249077 A1 | 10/2009 | Gargaro | |
| 2010/0014110 A1 | 1/2010 | Munetomo | |
| 2010/0180328 A1 | 7/2010 | Moas | |
| 2010/0225962 A1 | 9/2010 | Okigami et al. | |
| 2010/0241857 A1 | 9/2010 | Okude | |
| 2010/0312833 A1 | 12/2010 | Rimmer | |
| 2011/0019228 A1 * | 1/2011 | Uchikawa | G06F 3/1204 358/1.15 |
| 2011/0069187 A1 | 3/2011 | Yokota | |
| 2011/0081860 A1 | 4/2011 | Brown | |
| 2011/0082940 A1 | 4/2011 | Montemurro | |
| 2011/0085196 A1 | 4/2011 | Liu | |
| 2011/0099378 A1 | 4/2011 | Kim | |
| 2011/0099590 A1 | 4/2011 | Kim | |
| 2011/0128389 A1 * | 6/2011 | Maeda | H04N 1/00204 348/207.1 |
| 2011/0134465 A1 | 6/2011 | Gha | |
| 2011/0261382 A1 * | 10/2011 | Koura | G06F 3/1208 358/1.13 |
| 2012/0011007 A1 * | 1/2012 | Blewett | G06Q 20/20 705/16 |
| 2012/0042087 A1 | 2/2012 | Berg | |
| 2012/0045059 A1 | 2/2012 | Fujinami | |
| 2012/0096131 A1 | 4/2012 | Bhandari | |
| 2012/0191611 A1 | 7/2012 | Kelly | |
| 2012/0205431 A1 | 8/2012 | Chang | |
| 2012/0210001 A1 | 8/2012 | Ryerson | |
| 2012/0239916 A1 | 9/2012 | Malasani | |
| 2012/0243029 A1 * | 9/2012 | St. Jacques, Jr. | G06F 3/1204 358/1.15 |
| 2012/0257245 A1 | 10/2012 | McCoog | |
| 2012/0322391 A1 | 12/2012 | Suzuki | |
| 2013/0050259 A1 | 2/2013 | Ahn | |
| 2013/0057913 A1 * | 3/2013 | Park | G06F 21/608 358/1.15 |
| 2013/0081121 A1 * | 3/2013 | Green | H04L 9/0827 726/7 |
| 2013/0100486 A1 * | 4/2013 | Mccoog | G06F 3/1204 358/1.15 |
| 2013/0139218 A1 * | 5/2013 | Roulland | G06F 21/42 726/3 |
| 2013/0148161 A1 * | 6/2013 | Park | G06F 3/1296 358/1.15 |
| 2013/0250358 A1 * | 9/2013 | Suzuki | H04L 67/14 358/1.15 |
| 2013/0300864 A1 | 11/2013 | Ko | |
| 2014/0282960 A1 * | 9/2014 | Tinnakornsrisuphap | H04L 63/083 726/7 |
| 2014/0328250 A1 * | 11/2014 | Hardy | H04W 12/08 370/328 |
| 2015/0003432 A1 * | 1/2015 | Tanaka | H04W 36/34 370/338 |
| 2015/0178721 A1 | 6/2015 | Pandiarajan | |
| 2015/0201099 A1 | 7/2015 | Hamasaki | |

FOREIGN PATENT DOCUMENTS

| | | |
|---|---|---|
| CN | 101827363 A | 9/2010 |
| JP | 2006-148311 A | 6/2006 |
| JP | 2006-191403 | 7/2006 |
| JP | 2008193265 A | 8/2008 |
| JP | 2008-213294 A | 9/2008 |
| JP | 2009-017570 A | 1/2009 |
| JP | 2011-198017 | 10/2011 |
| WO | WO 2005/119401 | 12/2005 |
| WO | WO-2010131415 A1 * | 11/2010 ........... H04L 9/0866 |
| WO | WO 2010131415 A1 | 11/2010 |

OTHER PUBLICATIONS

Toshiba. "Multifunctional Digital Systems Scanning Guide GA-1201", Sep. 2009. (Year: 2009).*

Kyocera. "Scan to SMB(PC) Set up Guide", Nov. 2008. (Year: 2008).*

Xerox. "Xerox® WorkCentre® 7120 User Guide", May 2010. (Year: 2010).*

International Search Report for corresponding International Application No. PCT/JP2013/051952 dated Apr. 23, 2013.

U.S. Office Action dated Oct. 20, 2015 for corresponding U.S. Appl. No. 14/376,768.

U.S. Office Action dated Mar. 16, 2016 for corresponding U.S. Appl. No. 14/376,768.

(56) References Cited

OTHER PUBLICATIONS

U.S. Office Action dated Jul. 21, 2016 for corresponding U.S. Appl. No. 14/376,768.
U.S. Office Action dated Dec. 7, 2016 for corresponding U.S. Appl. No. 14/376,768.
U.S. Office Action dated Apr. 12, 2017 for corresponding U.S. Appl. No. 14/376,768.
U.S. Office Action dated Aug. 31, 2017 for corresponding U.S. Appl. No. 14/376,768.

* cited by examiner

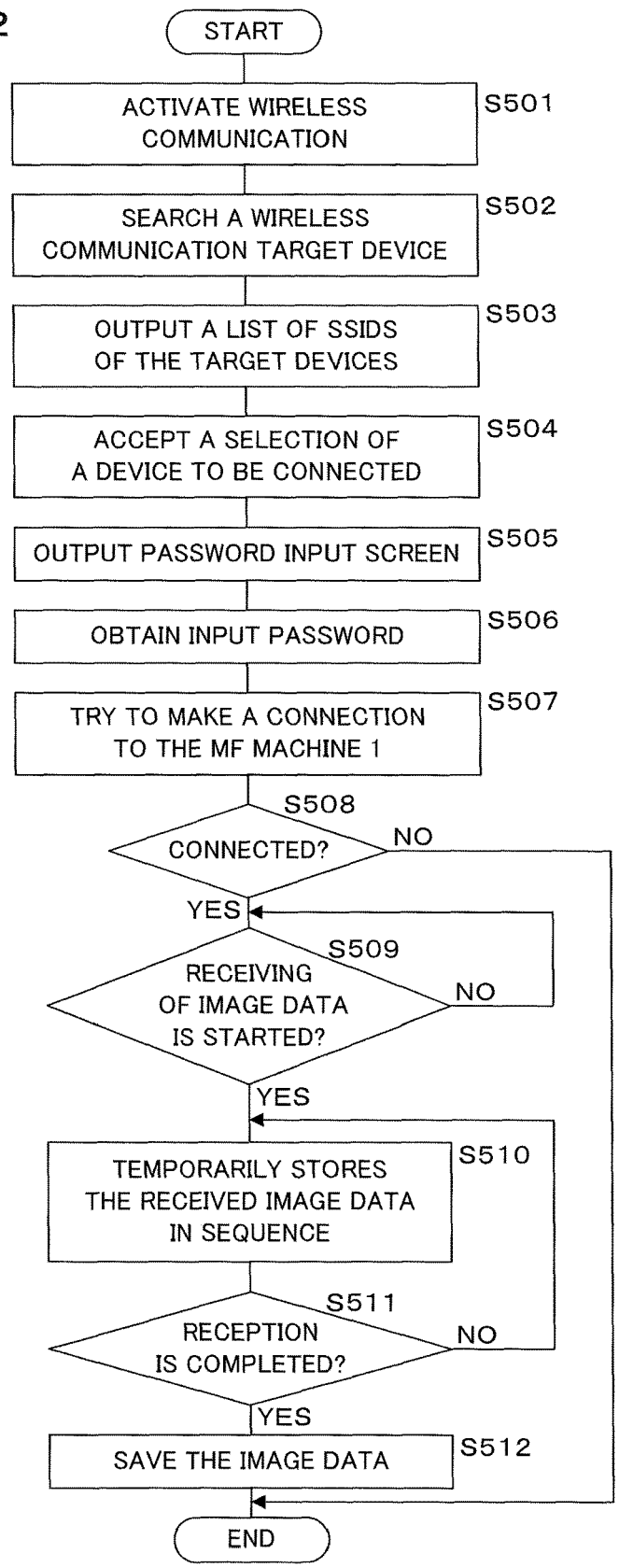

INFORMATION PROCESSING SYSTEM, INFORMATION PROCESSING DEVICE, AND COMMUNICATION CONNECTION METHOD

This application is a continuation of U.S. application Ser. No. 14/376,768, filed on Aug. 5, 2014, which is the national phase under 35 U.S.C. § 371 of PCT International Application No. PCT/JP2013/051952 which has an International filing date of Jan. 30, 2013 and designated the United States of America. The enclosures of both are hereby incorporated by reference.

BACKGROUND OF THE INVENTION

1. Field of the Invention

The present invention relates to an information processing system in which a communication device and an information processing device send and receive information to/from each other through wireless communication. More specifically, the present invention relates to an information processing system which can simplify operation in the communication device and ensure the security for connection, an information processing device constituting the information processing system, and a method of communication connection between the communication device and the information processing device.

2. Description of Related Art

Portable communication terminal devices, i.e. so-called smartphones, have widely been used. Such a communication terminal device is highly convenient since it may have various functions by adding various types of applications to the functions of a camera, game, media player and the like.

Recently, such a technique has widely been employed that a communication terminal device is connected through wireless communication to a network connected to a printing-out device (printer) with a wireless communication function, and the communication terminal device sends and receives information to/from the printing-out device. In particular, such a system has been realized that image data can be sent from a communication terminal device with a cameral function to a printing-out device in the same network, and the printing-out device can directly print out the image without the intermediary of a storage medium, USB cable, personal computer or the like.

As described above, since a system capable of directly sending image data from a communication terminal device to a printing-out device through wireless communication and printing out the image has been realized, services are provided in that a printing-out device such as a multifunction machine is installed in a public space for unspecified users, to print out an image shot by a communication terminal device with a camera function. Some of such services employ a method of connecting a communication terminal device to a printing-out device only with a network name (SSID: Service Set Identifier) without a password.

A conventional invention discloses a technique related to security for connection between a wireless communication device (child device) and an access point (parent device). The disclosed technique proposes a method of generating a one-time password for setting at the access point side, inputting by a user the generated one-time password into the wireless communication device, connecting the wireless communication device and the access point by generating at each of them an SSID and a password for setting based on the one-time password, exchanging the SSIDs and passwords for data communication during connection for setting, and then automatically connecting the wireless communication device with the access point for data communication.

SUMMARY OF THE INVENTION

In a service for sending image data of an image shot by a communication terminal device with a camera function through wireless communication to print out the same by a printing-out device installed in a public place, it is necessary to encrypt data communication in order to prevent the data from being intercepted by other devices. Moreover, a configuration where one communication terminal device can be connected to a printing-out device while another communication terminal device can communicate with the printing-out device has a security problem.

Though the above disclosed method takes security into consideration, it is necessary for a user to perform operation of inputting a generated one-time password to a child device when a connection is made for setting. In addition, setting and communication can only be conducted between communication devices having a function of generating SSIDs and passwords used for connection for setting. The conventional technique contemplates communication setting between specific communication devices installed in a fixed manner and thus the operation is required only once, which causes no problem. When, however, it is applied to communication between an unspecified communication terminal device and a printing-out device, a configuration in which a communication terminal device and a printing-out device store an SSID and a password for data communication and then automatically communicate with each other, the communication terminal device communicates with the printing-out device every time it approaches the once-used printing-out device, causing a problem.

The present invention has been made in view of the circumstances described above, and has an object of providing an information processing system which can ensure the security for communication while simplifying operation in a communication device when a connection from an unspecified communication device is taken into consideration, an information processing device constituting the information processing system and a communication connection method between a communication device and an information processing device.

According to the present invention, connection from a communication device to an information processing device, or sending/receiving of information between them are limited by a one-time password. Thus, even a communication device which once successfully made a connection still needs to obtain a new password when trying to connect to the information processing device again. Moreover, in the present invention, even an authenticated connection has a limited period of communication connection, which is based on a timing at which predetermined processing is started, completed or the like. Accordingly, a configuration in which an information processing device is installed in a public place may prevent the information processing device from being automatically connected from multiple communication devices, which can ensure the security.

BRIEF DESCRIPTION OF THE SEVERAL VIEWS OF THE DRAWINGS

FIG. 12 is a flowchart illustrating an example of a processing procedure performed when a scan sending service at a communication terminal device according to Embodiment 3;

DETAILED DESCRIPTION

Embodiments for an information processing system, information processing device and communication connection method according to the present invention will be described below with reference to the drawings.

(Embodiment 1)

Embodiment 1 describes an example where the present invention is applied to a printing service system including a communication terminal device having a camera function as well as a function of sending image data shot by the camera through wireless communication, and a multifunction machine receiving image data sent from the communication terminal device and printing out the same.

Figure 1:
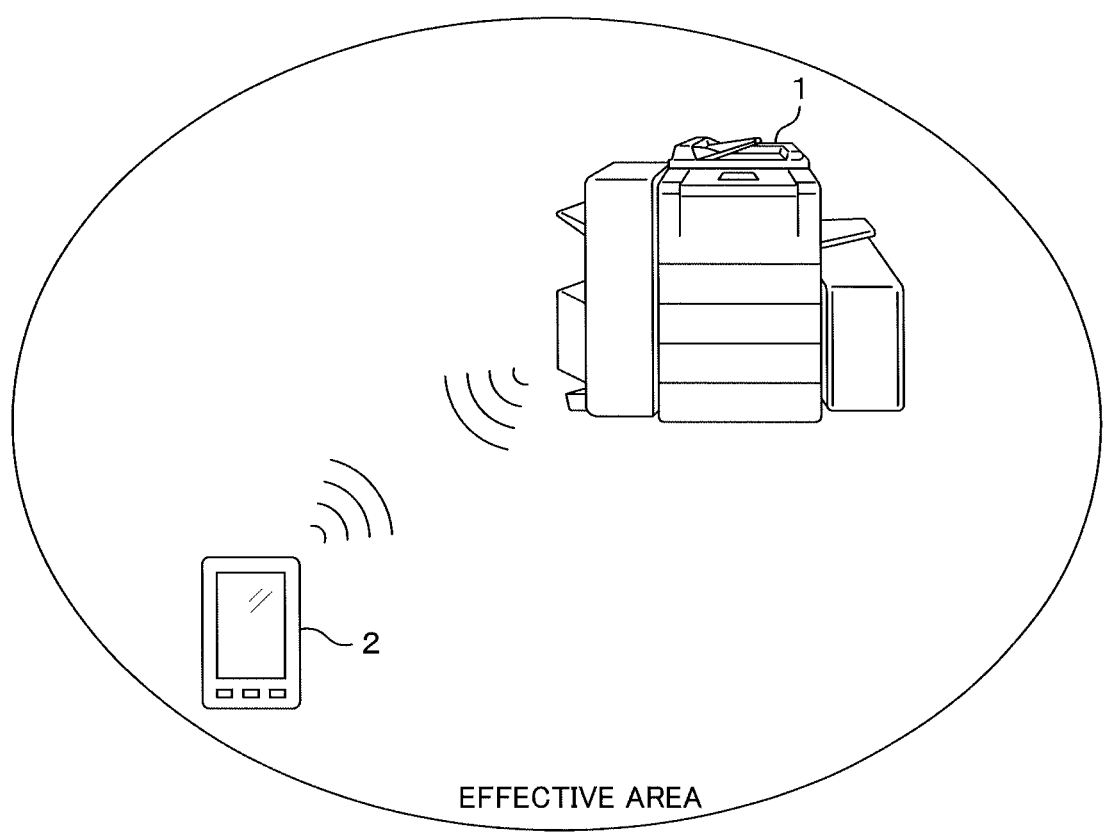
FIG. 1 is a schematic view schematically illustrating a configuration of a printing service system according to Embodiment 1.
Figure 2:
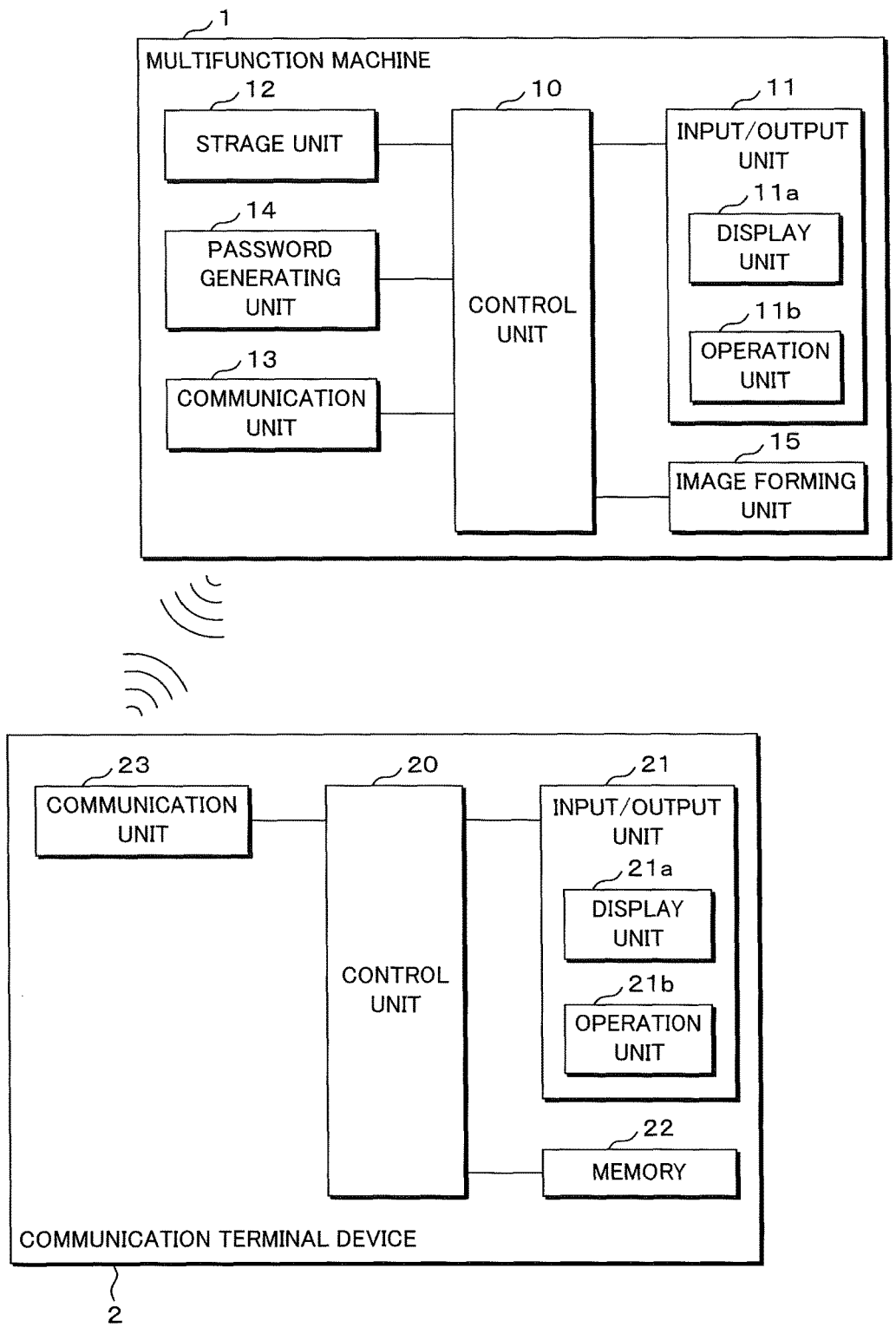
FIG. 2 is a block diagram illustrating a configuration of a printing service system according to Embodiment 1.

FIG. 1 is a schematic view schematically illustrating a configuration of a printing service system according to Embodiment 1, and FIG. 2 is a block diagram illustrating a configuration of the printing service system according to Embodiment 1. The printing service system includes a multifunction machine 1 installed in a place available for unspecified users, such as public facilities like a library, and also includes a communication terminal device 2 owned by an unspecified user. The multifunction machine 1 is able to make a communication connection with the communication terminal device 2 present in an effective area of wireless communication. Such a system allows a user to send image data shot with a camera function included in the communication terminal device 2 to the multifunction machine 1 through wireless communication, and to print it out by the multifunction machine 1. A store or a public facility manages the billing for the printing-out processing, to realize the printing service.

According to the present invention, in a case where unspecified multiple users respectively carrying communication terminal devices 2 make entrance into the effective area of wireless communication, the security for the multifunction machine 1 can be ensured.

The multifunction machine 1 is an information processing device including a printing-out function (printer), a reading function (scanner), a facsimile function and the like to perform processing on image data. The multifunction machine 1 includes a control unit 10 controlling each component, an input/output unit 11 using a touch panel and an LCD (Liquid Crystal Display), a memory 12 storing various kinds of information, a communication unit 13 implementing communication with the communication terminal device 2, a password generating unit 14 generating a password, and an image forming unit 15 realizing a printing-out function. The multifunction machine 1 also includes, in addition to the above, components for realizing a number of functions, such as an image reading unit for implementing a reading function and a facsimile communication unit for performing facsimile communication through a telephone network, which are not illustrated or described here in detail.

The control unit 10 uses a CPU (Central Processing Unit) to control each component based on a control program stored in a build-in ROM (Read Only Memory).

The input/output unit 11 includes a display unit 11a using an LCD to output information and an operation unit 11b obtaining information input by user's operation with a touch panel provided on the LCD. The operation unit 11b may also employ a hardware key provided adjacent to the display unit 11a, not limited to the touch panel. For the display unit 11a displaying various types of icons or buttons, the position on the touch panel touched by the user is sensed by the operation unit 11b, while the control unit 10 can specify which icon or button is touched based on the information of the position touched by the user and on the positional information of icons or buttons displayed on the display unit 11a. Furthermore, the control unit 10 is able to specify which hardware key is pressed based on the information sent from the operation unit 11b.

The memory 12 employs an HDD (Hard Disk Drive) or an SSD (Solid State Drive). In the memory 12, an SSID for the multifunction machine 1 is stored, which can be read out by the control unit 10. The memory 12 may also store image data received from the communication terminal device 2.

The communication unit 13 implements a wireless communication function. The communication unit 13 is able to send and receive data to/from the communication terminal device 2 through wireless communication. It is noted that the communication unit 13 has a function of an access point, i.e. a function of a parent machine in a wireless LAN, and is configured to execute authentication processing with a password, which will be described later. Note that the communication unit 13 may be connected to one communication terminal device 2 in an adhock mode, and is configured not to be connected for communication simultaneously with multiple communication terminal devices 2. In addition, a method of connection through an access point of a local network deployed in a facility may also be employed.

The password generating unit 14 generates a one-time password for wireless connection based on an instruction from the control unit 10. The password generating unit 14 generates a one-time password by, for example, creating five-digit alphanumeric characters based on randomly generated numbers. Generation of a one-time password is not limited to the method described above but may be realized by various different methods including known methods.

The image forming unit 15 employs a printer unit. The printer unit is disposed below the scanner unit inside the main body of the multifunction machine 1. The printer unit generates a toner image based on image data sent from the control unit 10, and forms an image by transferring the toner image onto a sheet of paper.

The communication terminal device 2 is a mobile telephone, i.e. a so-called smartphone. The communication terminal device 2 may be a tablet PC (Personal Computer). The communication terminal device 2 includes a control unit 20 controlling each component, an input/output unit 21 using a touch panel, a memory 22 storing various kinds of information, and a communication unit 23 implementing communication with the multifunction machine 1.

The control unit 20 uses a CPU to control each component based on a control program stored in a built-in ROM.

The input/output unit 21 includes a display unit 21a outputting information using an LCD, and an operation unit 21b obtaining information input by user's operation with a touch panel and hardware key provided on the LCD. On the display unit 21a displaying various types of icons or buttons, the operation unit 21b senses the position touched by a user on the touch panel and notifies the control unit 20 of the information of the position touched by the user. The control unit 20 is able to specify which icon or button is touched based on the positional information of icons or buttons displayed on the display unit 21a. When a hardware key is pressed, the operation unit 21b notifies the control unit 20 of the information specifying which key is pressed.

The memory 22 uses a RAM (Random Access Memory) and a flash memory. The memory 22 stores therein an application program used to print out image data at the multifunction machine 1 (hereinafter referred to as "print application"). The control unit 20 reads out and executes the print application stored in the memory 22 to implement communication with the multifunction machine 1 as well as sending of image data to the multifunction machine 1, which will be described later.

Furthermore, in a flash memory of the memory 22, the image data of an image shot with a camera function (not illustrated) is stored. The control unit 20 may temporarily store the information input by the operation unit 21b in the RAM of the memory 22 or store it in the flash memory for saving, as will be described later.

The communication unit 23 implements a wireless communication function. Based on the instructions from the control unit 20, the communication unit 23 becomes connected to the communication unit 13 of the multifunction machine 1. The communication unit 23 allows the control unit 20 to send and receive data to/from the multifunction machine 1.

A procedure in thus configured image processing system where the communication terminal device 2 connects to the multifunction machine 1, sends image data, which is printed out by the multifunction machine 1, will now be described with reference to the flowchart and examples of the operation screen.

Figure 3A:
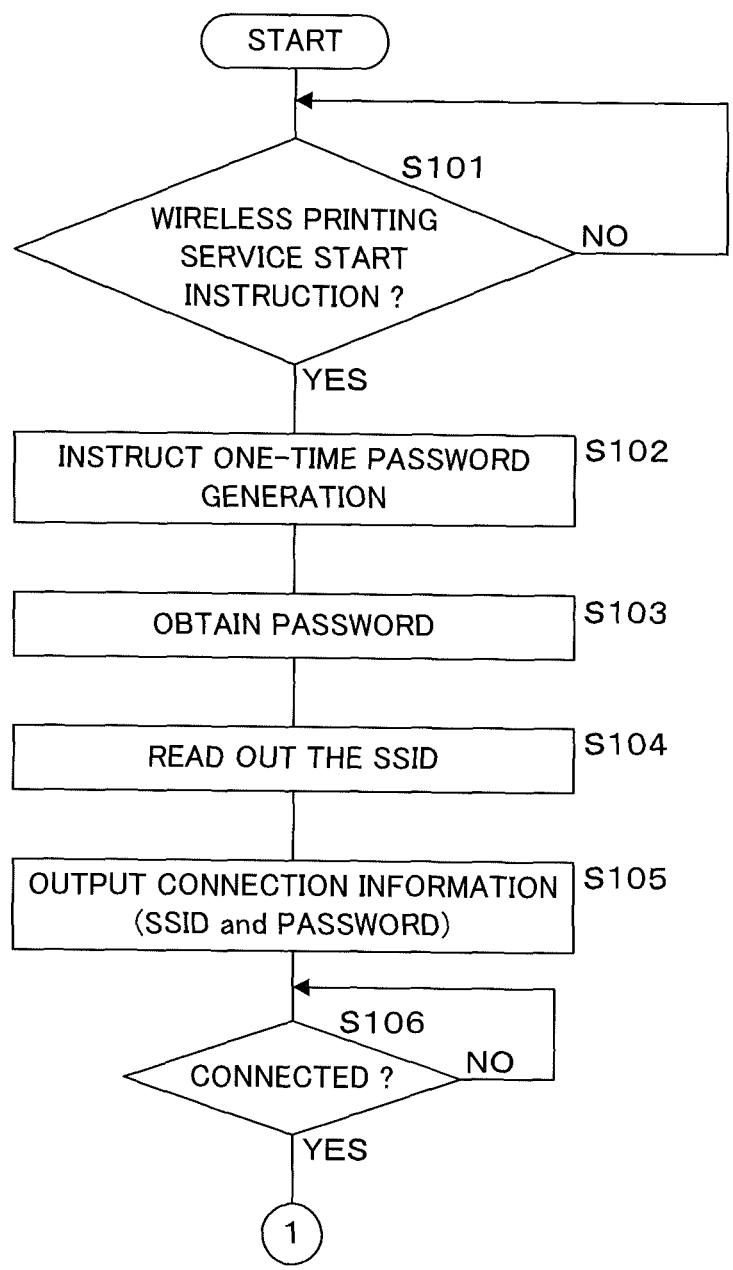
FIG. 3A is a flowchart illustrating an example of a processing procedure performed when a printing service is executed at a multifunction machine according to Embodiment 1.
Figure 3B:
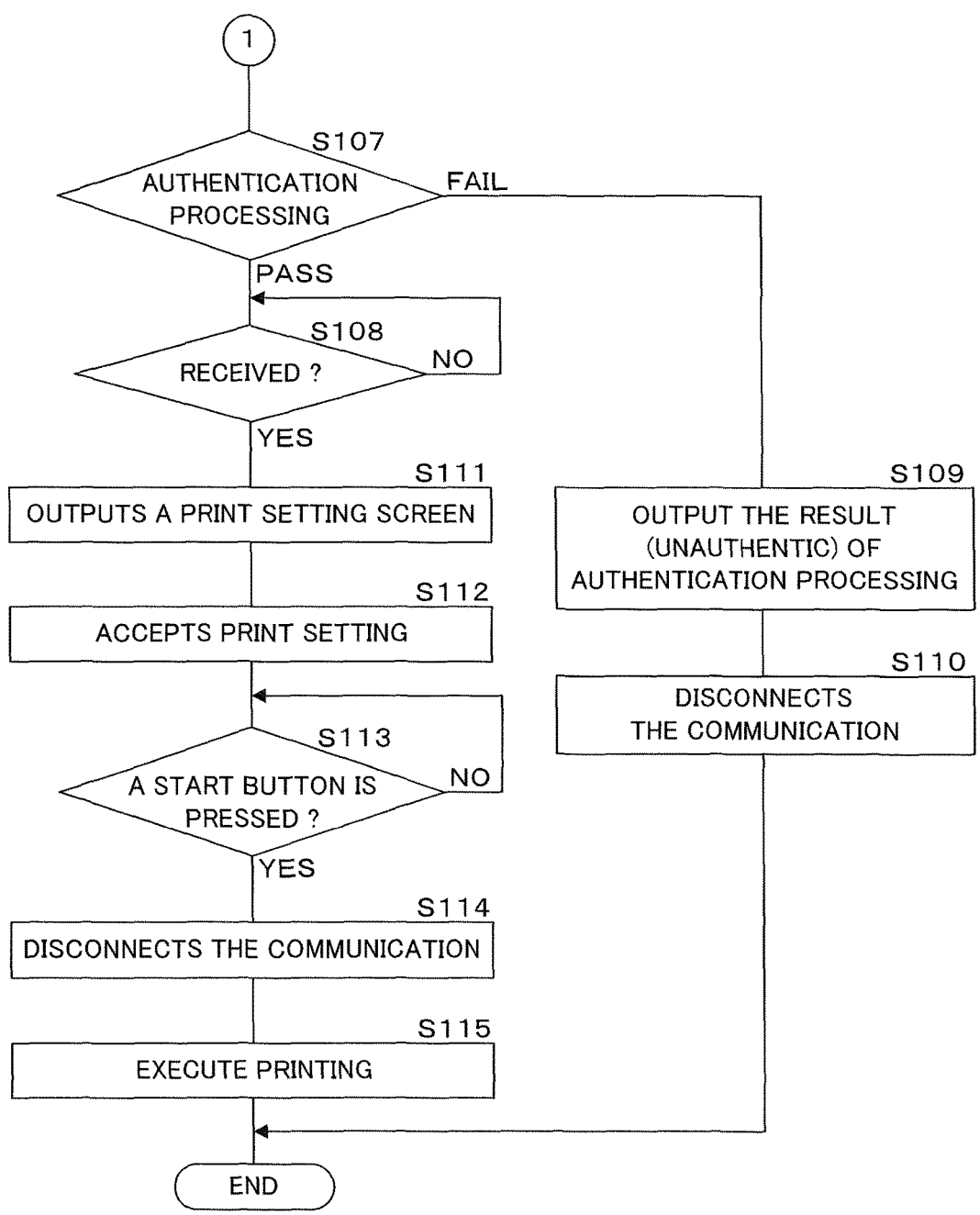
FIG. 3B is a flowchart illustrating an example of a processing procedure performed when a printing service is executed at a multifunction machine according to Embodiment 1.

FIGS. 3A and 3B show a flowchart illustrating an example of a processing procedure performed when a printing service is executed at the multifunction machine 1 according to Embodiment 1. The processing procedure described below corresponds to the processing procedure in the communication terminal device 2 illustrated in the flowchart of FIG. 7, which will be described later. The multifunction machine 1 executes the processing as described below in the state of waiting while an initial screen is displayed on the display unit 11a and the wireless communication function by the communication unit 13 is being enabled.

The control unit 10 determines, on the initial screen displayed on the display unit 11a, whether or not a photograph printing service is selected by the operation unit 11b and a mobile telephone is selected on the screen for selecting a storage medium for image data, i.e. whether or not an instruction is provided to start the wireless printing service (step S101). The photograph printing service targeted for image data from a mobile phone will hereinafter be referred to as "wireless printing service."

Figure 4:
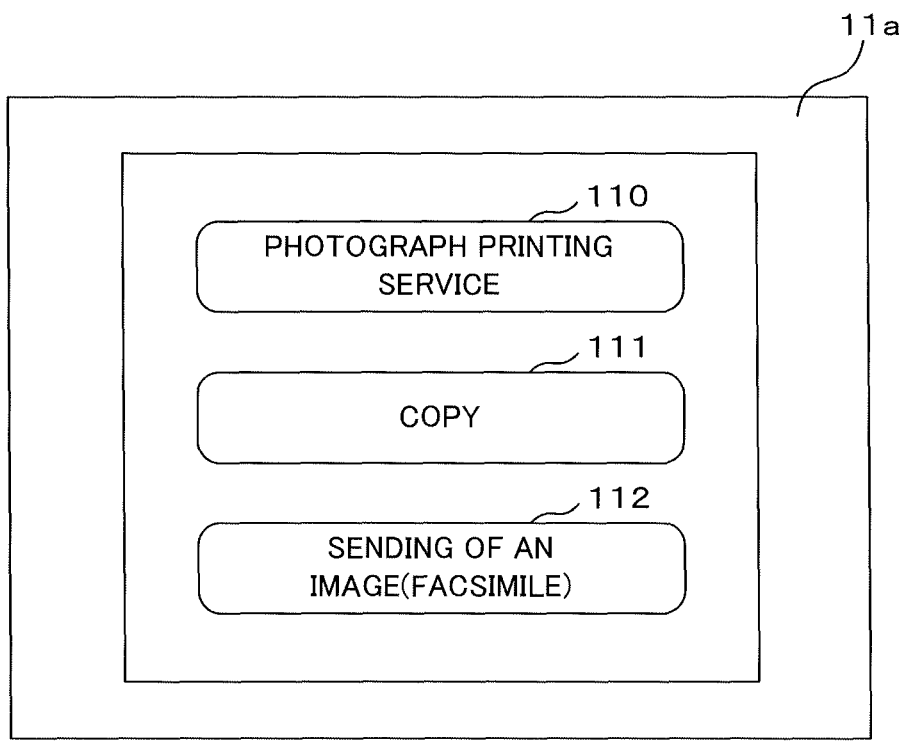
FIG. 4 is an explanatory view illustrating a screen example of an initial screen displayed on a display unit of a multifunction machine.
Figure 5:
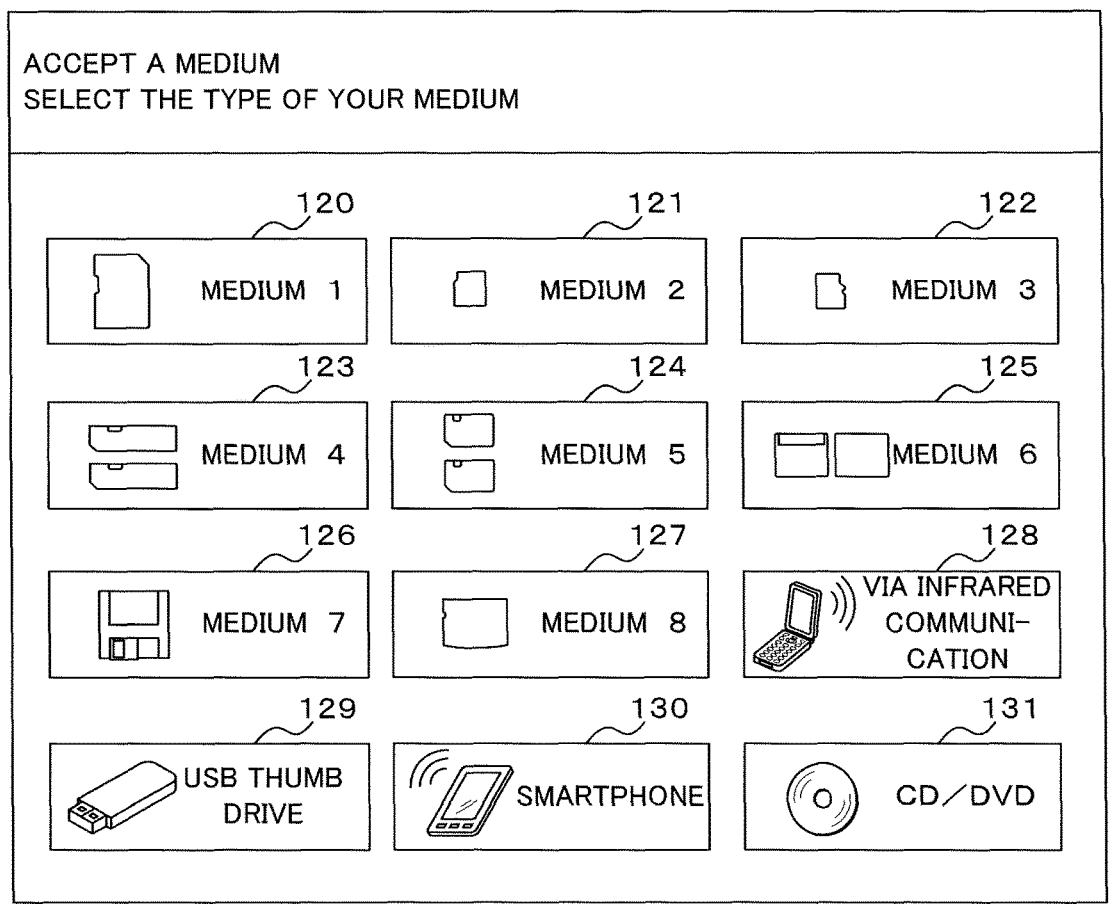
FIG. 5 is an explanatory view illustrating a screen example of a storage medium selecting screen.

FIG. 4 is an explanatory view illustrating a screen example of an initial screen displayed on the display unit 11a of the multifunction machine 1, and FIG. 5 is an explanatory view illustrating a screen example of a storage medium selecting screen. As illustrated in FIG. 4, an icon 110 for executing a photograph printing service is displayed on the initial screen so that the user can touch it to provide instructions to start the photograph printing service. On the initial screen, in addition to the above, an icon 111 for starting copying and an icon 112 for starting sending of an image including a facsimile are also displayed for example. When the user touches the touch panel on the icon 110 for starting the photograph printing service in FIG. 4, the storage medium selecting screen in FIG. 5 is displayed on the display unit 11a. As illustrated in FIG. 5, icons 120 to 131 are displayed for selecting the type of a storage medium (media) in which image data to be printed are stored. The user touches any one of the icons to select the type of a storage medium. Among them, the icon 130 is for the image from a mobile phone having a wireless communication function. The user may touch the icon 130 to provide an instruction to start the wireless printing service.

If it is determined that no instructions are provided to start the wireless printing service (S101: NO), the control unit 10 returns the processing to step S101 and waits until it is determined that the instruction is provided to start the wireless printing service through the operation unit 11b.

If it is determined that the user touches the touch panel on the icon 110 in FIG. 4, that the operation unit 11b senses that the user touched the touch panel on the icon 130 in FIG. 5, and that the instruction is provided to start the wireless printing service (S101: YES), the control unit 10 instructs the password generating unit 14 to generate a one-time password (step S102). The control unit 10 obtains the password generated by the password generating unit 14 (step S103), and reads out the SSID of the device itself from the memory 12 (step S104). The control unit 10 then outputs connection information (SSID and one-time password) used for connection with the multifunction machine 1, to be displayed on the display unit 11a (step S105).

Figure 6:
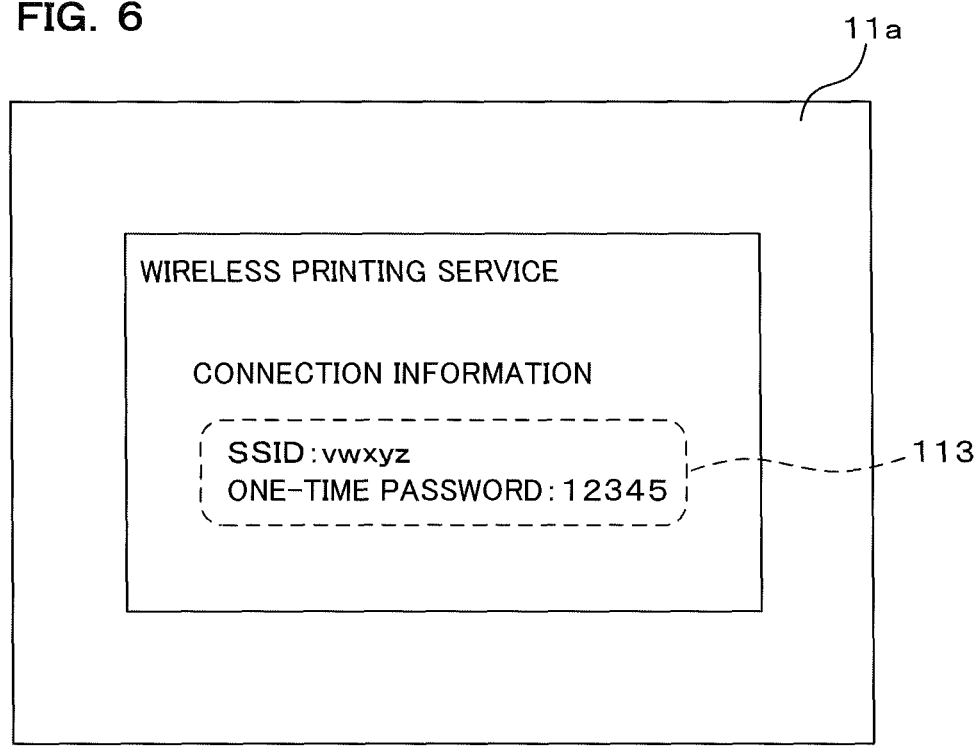
FIG. 6 is an explanatory view illustrating an example of connection information displayed on a display unit of a multifunction machine.

FIG. 6 is an explanatory view illustrating an example of connection information displayed on the display unit 11a of the multifunction machine 1. As illustrated in FIG. 6, by the control of the control unit 10, five-digit alphanumeric characters, for example, "vwxyz" for the SSID and "12345" for the one-time password, are shown in a connection information display area 113. The user views the connection information display area 113 to recognize such information. It is to be understood that the SSID and one-time password in FIG. 6 are exemplary and other alphanumeric characters, symbols or the like may also be used.

Description continues with reference to FIG. 3A again.

Next, the control unit 10 determines whether or not a connection is made from the communication terminal device 2 through the communication unit 13 (step S106). If it is determined that no connection is made (S106: NO), the control unit 10 returns the processing to step S106, and waits until it is determined that a connection is made.

It is noted that, at step S106, in the case where a certain period of time has elapsed since the timing for generating a password (S102) while remaining unconnected, the processing may be terminated and the connection with the password generated at step S102 may be invalidated. Here, the display unit 11a is returned to the state where the storage medium selecting screen shown in FIG. 5 is displayed.

If it is determined at step S106 that a connection is made from the communication terminal device 2 (S106: YES), the control unit 10 executes authentication processing based on the SSID and password sent when connecting, that is, to determine whether or not the password is valid (step S107). If it is recognized, as a result of the authentication processing, that the password is valid and authentic (S107: PASS), the control unit 10 determines whether or not image data is received (step S108), and if it is determined that no image data is received (S108: NO), returns the processing to step S108 to wait until it is determined that image data is received. If it is determined that, as a result of authentication processing at step S107, the password is invalid and unauthentic (S107: FAIL), the control unit 10 outputs the result of authentication processing to the display unit 11a (step S109). The control unit 10 then disconnects the communication (step S110) and terminates the processing. Here, the display unit 11a is returned to the state where the storage medium selecting screen shown in FIG. 5 is displayed thereon. In such a case, it may be possible to invalidate the password generated at step S102 at the time when the processing is terminated or to accept the authentication processing again. In the case where the authentication processing is accepted again, it is preferable to limit the time and the number of trials.

It is noted that the control unit 10 at step S107 does not authenticate simultaneous connection from multiple communication terminal devices 2. If more than one communication terminal devices 2 make connections using one same password, the control unit 10 determines that only the first communication terminal device 2 which made a connection the earliest is authentic.

If it is determined that image data is received at step S108 (S108: YES), the control unit 10 outputs a print setting screen to be displayed on the display unit 11a (step S111), and accepts print setting (step S112). Subsequently, the control unit 10 determines whether or not a start button for providing instructions to start printing-out is pressed (step S113). If it is determined that the button is not pressed (S113: NO), the control unit 10 returns the processing to S113 to wait until the button is pressed. When sensing that the button is pressed (S113: YES), the control unit 11 disconnects the communication connection with the communication terminal device 2 before the subsequent printing-out processing (step S114), sends the print setting accepted at step S112 and the image data received at step S108 to the image forming unit 15, executes printing-out (step S115), and terminates the processing. Here, the display unit 11a is returned to the state where the storage medium selecting screen in FIG. 5 is shown. The password generated at step S102 is invalidated at the time when the processing is terminated.

It is not always necessary to disconnect the communication in the processing at step S114. It may also be possible to make the connection with the communication terminal device valid only before the printing-out processing at step S115 is started, and to reject it even if the connection is tried again. Moreover, communication connection may be disconnected from the multifunction machine 1 not only before the printing-out is started but immediately after printing-out is completed, or the connection from the communication terminal device 2 using a password generated at step S102 may be rejected after printing-out is completed. In other words, connection may be valid only for a period until sending and receiving of image data with the communication terminal device 2 is completed.

Figure 7:
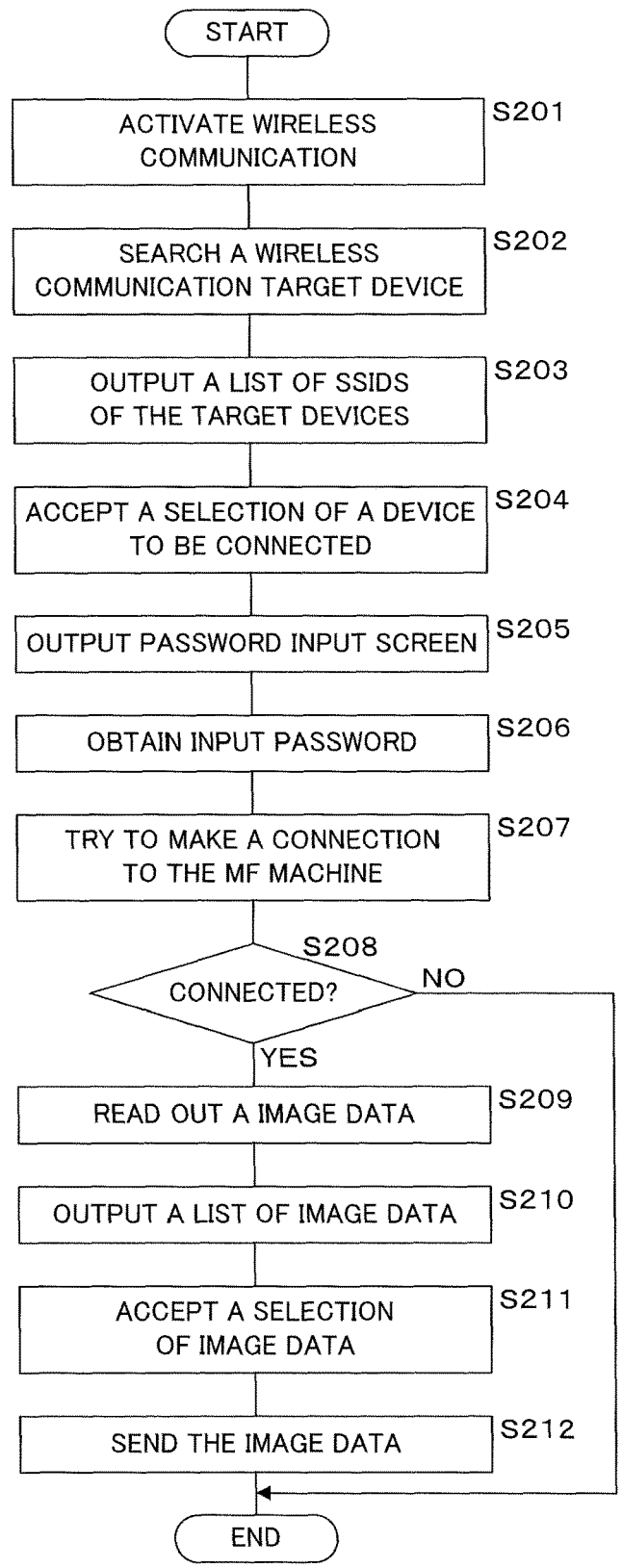
FIG. 7 is a flowchart illustrating an example of a processing procedure performed when a printing service is used at a communication terminal device according to Embodiment 1.

FIG. 7 is a flowchart illustrating an example of a processing procedure performed when a printing service is used at a communication terminal device 2 according to Embodiment 1. When the control unit 20 reads out and executes a print application by the control of the user, the communication terminal device 2 executes the processing described below.

The control unit 20 activates the communication unit 23 to enable wireless communication (step S201). The communication unit 23 searches for a target device for wireless communication (step S202), and outputs a list of SSIDs of the target devices obtained as a result of the search as well as the SSIDs stored in the memory 22 (step S203). The control unit 20 accepts a selection of a device to be connected from the output list (step S204). It is noted that the input of SSIDs from the user may also be accepted at step S203.

Figure 8:
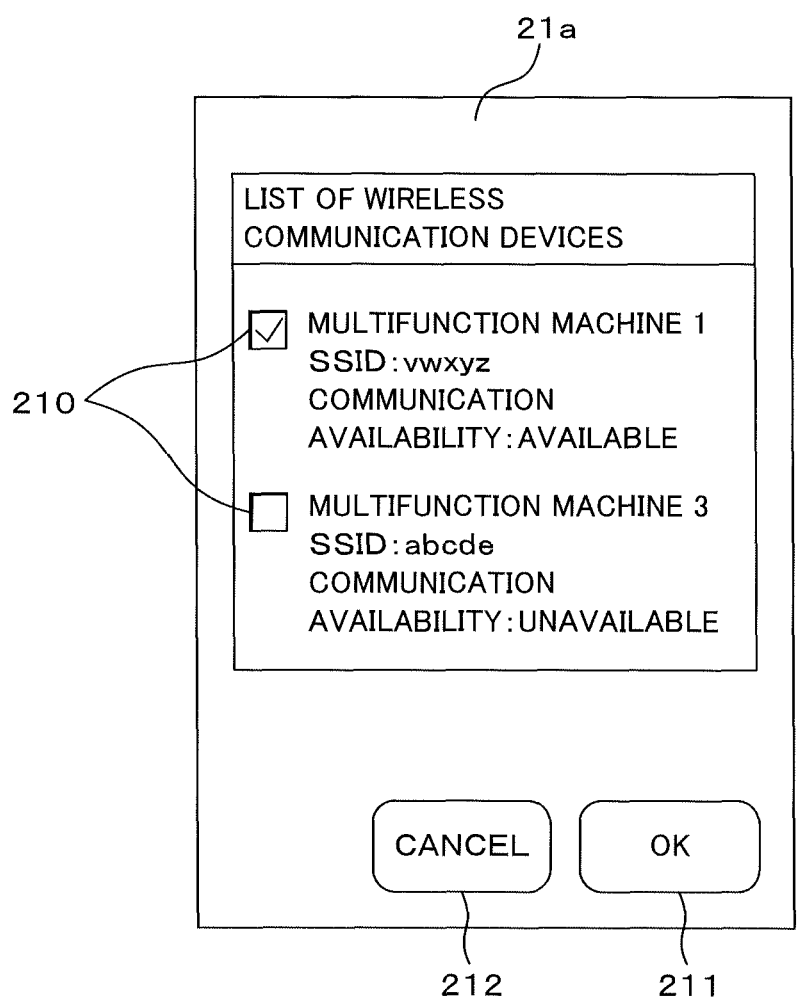
FIG. 8 is an explanatory view illustrating an example of a list of wireless communication devices displayed on a display unit at a communication terminal device.

FIG. 8 is an explanatory view illustrating an example of a list of wireless communication devices displayed on a display unit 21a at the communication terminal device 2. As shown in FIG. 8, the SSID for the multifunction machine 1 and that for another multifunction machine 3 are displayed together with their respective communication availability. Furthermore, a button 210 for selecting a device as a target device for connection is shown for each of the communication devices, and an "OK" icon 211 and a "CANCEL" icon 212 are also displayed. The user may touch the touch panel on the button 210 for the multifunction machine 1 to be connected and touch the touch panel on the "OK" icon 211, to provide instructions for connection to the multifunction machine 1. The control unit 20 then senses that the multifunction machine 1 is selected at the operation unit 21b and that the touch panel on the "OK" icon 211 is touched, and tries to connect to the multifunction machine 1.

Assuming that the multifunction machine 1 is selected by the user from the list of wireless communication devices shown in FIG. 8, description continues with reference to the flowchart in FIG. 7 again.

The control unit 20 outputs a password input screen for connecting to the selected multifunction machine 1, to be displayed on the display unit 21a (step S205), and obtains at the operation unit 21b a password to be input by the user on the password input screen (step S206).

Figure 9:
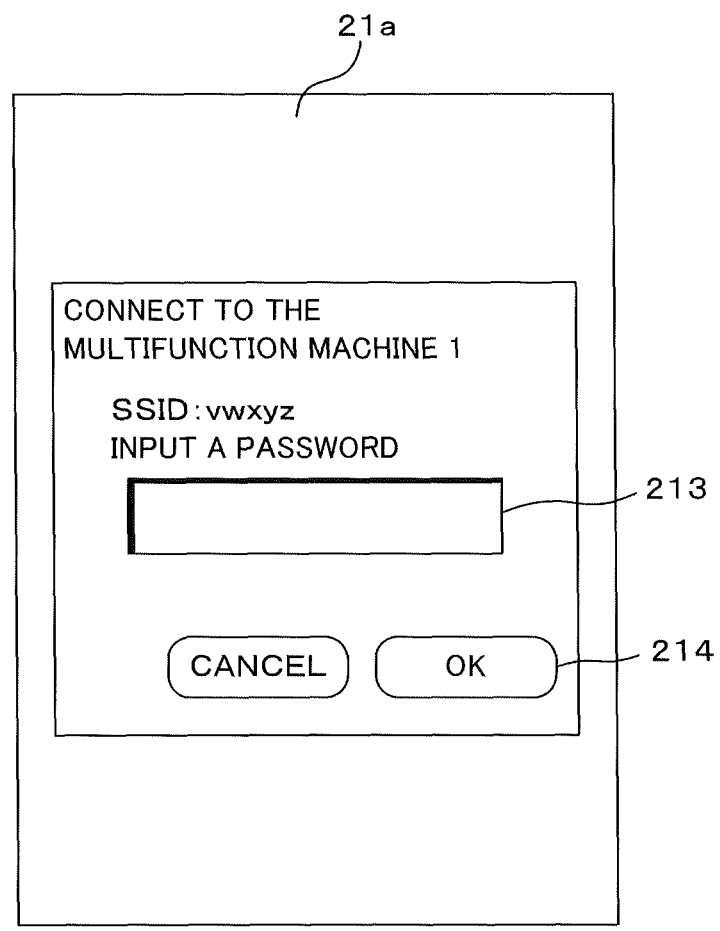
FIG. 9 is an explanatory view illustrating an example of a password input screen displayed on a display unit at a communication terminal device.

FIG. 9 is an explanatory view illustrating an example of a password input screen displayed on the display unit 21a in the communication terminal device 2. In the example shown in FIG. 9, the SSID for the multifunction machine 1 which is to be connected is displayed, while an acceptance unit 213 accepting the input of the password output to the display unit 11a at step S105 in the flowchart in FIG. 3A is also displayed. The user views the one-time password displayed on the display unit 11a of the multifunction machine 1, inputs the password to the acceptance unit 213, and touches the touch panel on the "OK" icon 214. This allows the communication terminal device 2 to obtain the password.

Description continues with reference to the flowchart in FIG. 7 again.

The control unit 20 tries to make a connection to the multifunction machine 1 through the communication unit 23 based on the password obtained at step S206 (step S207). The control unit 20 determines whether or not the connection succeeds (step S208), and if the connection fails because it is determined as unauthentic (S208: NO), terminates the processing. If it is determined that the connection succeeds (S208: YES), the control unit 20 reads out image data to be printed that is stored in the flash memory of the memory 22 (step S209) and outputs the list thereof to be displayed on the display unit 21a (step S210).

The control unit 20 accepts the selection of one or more pieces of image data from the list of the displayed image data (step S211), sends the accepted image data to the multifunction machine 1, which is being connected, through the communication unit 23 (step S212), and terminates the processing.

After step S212, the multifunction machine 1 disconnects the connection so that the communication terminal device 2 cannot send and receive image data to/from the multifunction machine 1.

The processing procedures shown in the flowcharts in FIGS. 3A, 3B and 7 ensure the security for connection to the multifunction machine 1. The password generated at step S102 is a one-time password, which limits the connection by, for example, disconnecting communication at the timing before and after printing-out. Thus, even if the communication terminal device 2 tries to connect with the same password later, the control unit 10 of the multifunction machine 1 will not approve the password as authentic in the authentication processing (S107). This ensures the security also in a configuration where a connection is made to an unspecified communication terminal device 2 for printing-out. The user can securely receive the printing service with simple operation by executing the operation for generating a password at the multifunction machine 1, inputting the generated password at the communication terminal device 2 and selecting image data to be printed.

It is to be understood that the screen examples shown in FIGS. 4, 5, 6, 8 and 9 are mere examples and the present embodiment may be implemented with other screen structures. For instance, the examples of FIGS. 4 and 5 may alternatively employ a structure in which the instruction for starting the wireless printing service may directly be provided from the initial screen or a structure in which the instruction for starting the wireless printing service may be provided via a different screen. It is also possible to have a structure in which the multifunction machine 1 automatically recognizes a mobile phone and a screen showing only the button for providing the instruction to start the wireless printing service may be displayed.

(Embodiment 2)

In Embodiment 1, the communication unit 13 in the multifunction machine 1 is able to continuously perform wireless communication. By contrast, in Embodiment 2, the period during which the communication unit 13 in the multifunction machine 1 can perform wireless communication is limited.

The printing service system according to Embodiment 2 has a configuration similar to that in Embodiment 1, except for detailed processing procedures performed in the multifunction machine 1, which will be described later. Accordingly, the configuration units common to those in Embodiment 1 are denoted by the same reference codes and will not be described in detail.

In Embodiment 2, the wireless communication function of the communication unit 13 in the multifunction machine 1 can be controlled for its enablement/disablement by the control unit 10. Basically, the wireless communication function of the communication unit 13 is disabled, and is enabled, when the user starts using the multifunction machine 1 and provides an instruction to start the wireless printing service through the operation unit 11b, only for a period until printing-out is started, that is, until sending and receiving of image data to/from the communication terminal device 2 is completed.

The processing in the communication terminal device 2 is similar to that in Embodiment 1, which will not be described in detail.

Details of the processing procedures in Embodiment 2 will be described below.

Figure 10A:
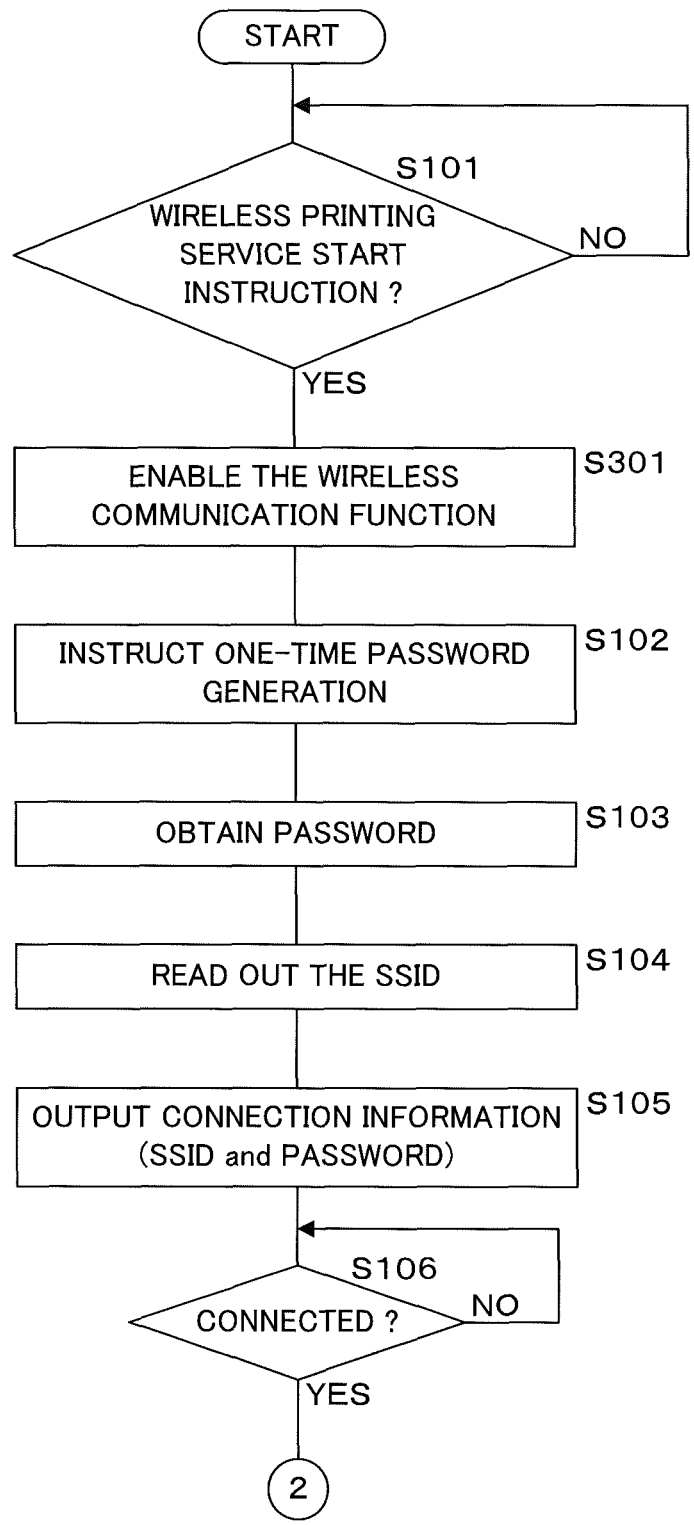
FIG. 10A is a flowchart illustrating an example of a processing procedure performed when a printing service is executed at a multifunction machine according to Embodiment 2.
Figure 10B:
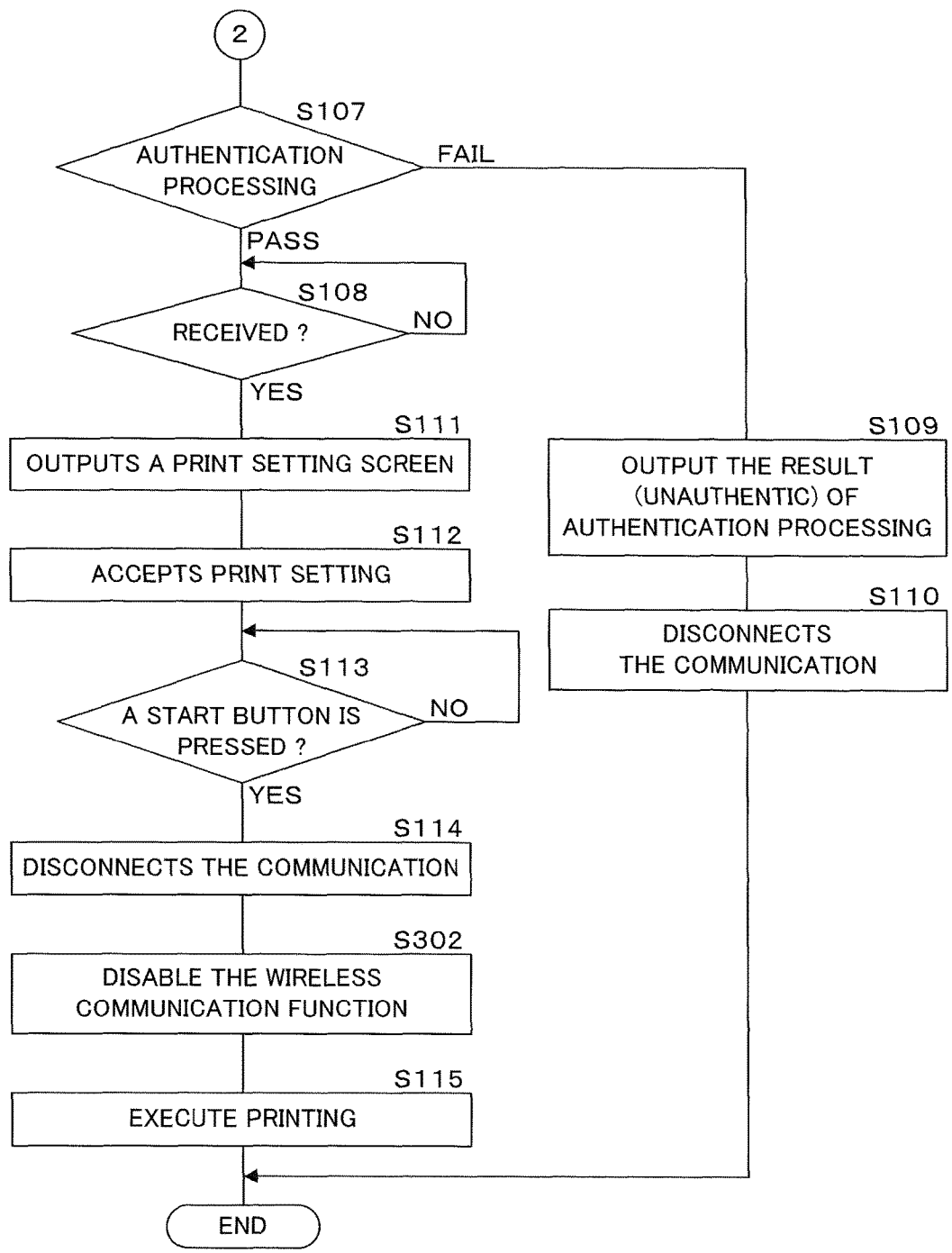
FIG. 10B is a flowchart illustrating an example of a processing procedure performed when a printing service is executed at a multifunction machine according to Embodiment 2.

FIGS. 10A and 10B show a flowchart illustrating an example of a processing procedure performed when the printing service is executed at the multifunction machine 1 according to Embodiment 2. Among the processing procedures described below, the ones common to the procedures illustrated in the flowchart in FIGS. 3A and 3B according to Embodiment 1 are denoted by the same step numbers, and will not be described in detail. The multifunction machine 1 according to Embodiment 2 executes the processing described below while in a waiting state where an initial screen is displayed on the display unit 11a and the wireless communication function of the communication unit 13 is disabled.

In Embodiment 2, when it is determined that an instruction is provided to start the wireless printing service through the operation on the initial screen and storage medium selecting screen displayed on the display unit 11a (S101: YES), the control unit 10 enables the wireless communication function of the communication unit 13 (step S301), and instructs the password generating unit 14 to generate a one-time password (S102). It is noted that the control unit 10 may enable the wireless communication function after the processing of steps S102 to S104.

In Embodiment 2, the control unit 10 then accepts print setting (S112), and if it senses that the start button for starting printing-out is pressed before the subsequent printing-out processing (S113: YES), disconnects the communication with the communication terminal device 2 (S114) and thereafter disables the wireless communication function in the communication unit 13 (step S302). After disabling the wireless communication function, the print setting accepted at step S112 and the image data received at step S108 are sent to the image forming unit 15, printing-out is executed (S115) and the processing is terminated.

As described above, Embodiment 2 allows the multifunction machine 1 to have higher security in communication by limiting an effective period of wireless communication function of the communication unit 13 and thus restricting the chances of connection from other wireless communication devices.

(Embodiment 3)

The present invention may also be applied, not only to the service in which image data held by a communication terminal device 2 is printed out from the multifunction machine 1, but also to the service in which image data obtained by scanning a document by the multifunction machine 1 is sent to a communication terminal device 2. In such a case, the print application of the communication terminal device 2 implements communication with the multifunction machine 1 as well as receiving of image data from the multifunction machine 1.

The system of image data sending according to Embodiment 3 has a hardware configuration similar to those in Embodiment 1 and 2, except for the processing procedure performed between the multifunction machine 1 and the communication terminal device 2. Accordingly, the configuration units common to those in Embodiment 1 are denoted by the same reference characters and will not be described in detail.

Image data sending is started when the user touches the touch panel on the icon 112 for starting sending of an image including a facsimile on the initial screen illustrated in FIG. 4. When the touch panel on the icon 112 is touched, the control unit 10 in the multifunction machine 1 displays a screen for selecting a destination to which the image is sent, on the display unit 11a. As the image sending destination, for example, a facsimile destination or a mobile phone through wireless communication may be selected. When a mobile phone is selected as the image sending destination, the processing described below is executed in the multifunction machine 1.

Figure 11A:
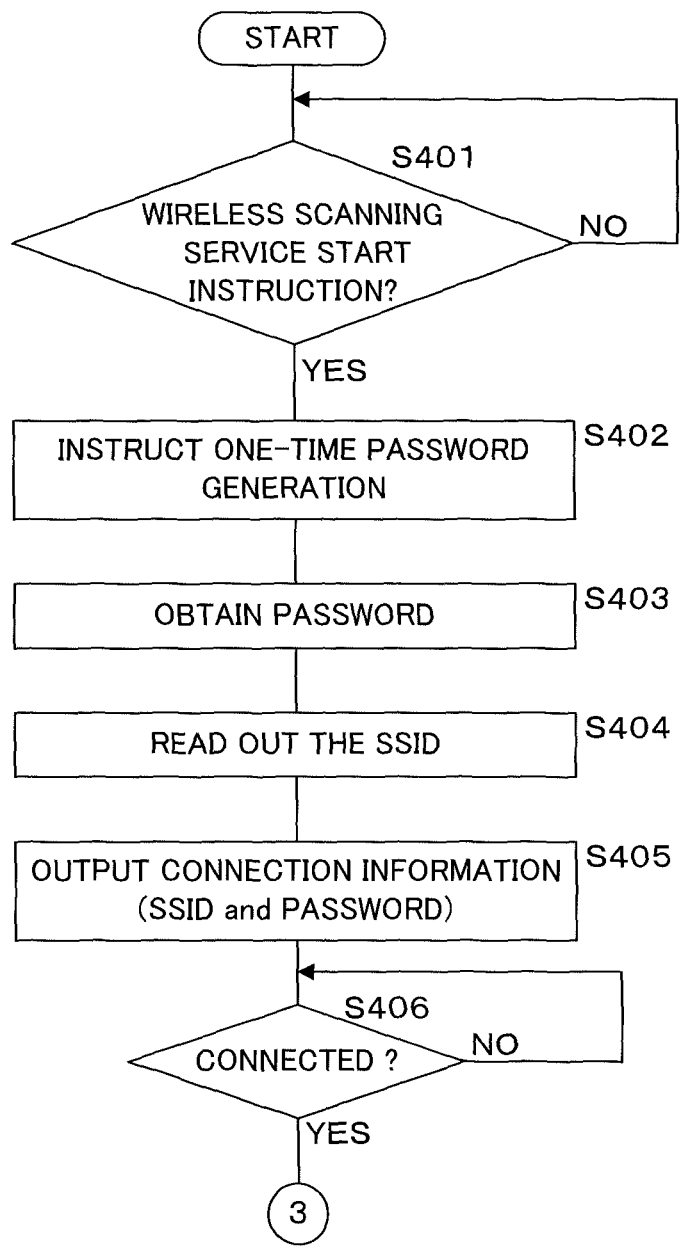
FIG. 11A is a flowchart illustrating an example of a processing procedure performed when an image sending service is executed in a multifunction machine according to Embodiment 3.
Figure 11B:
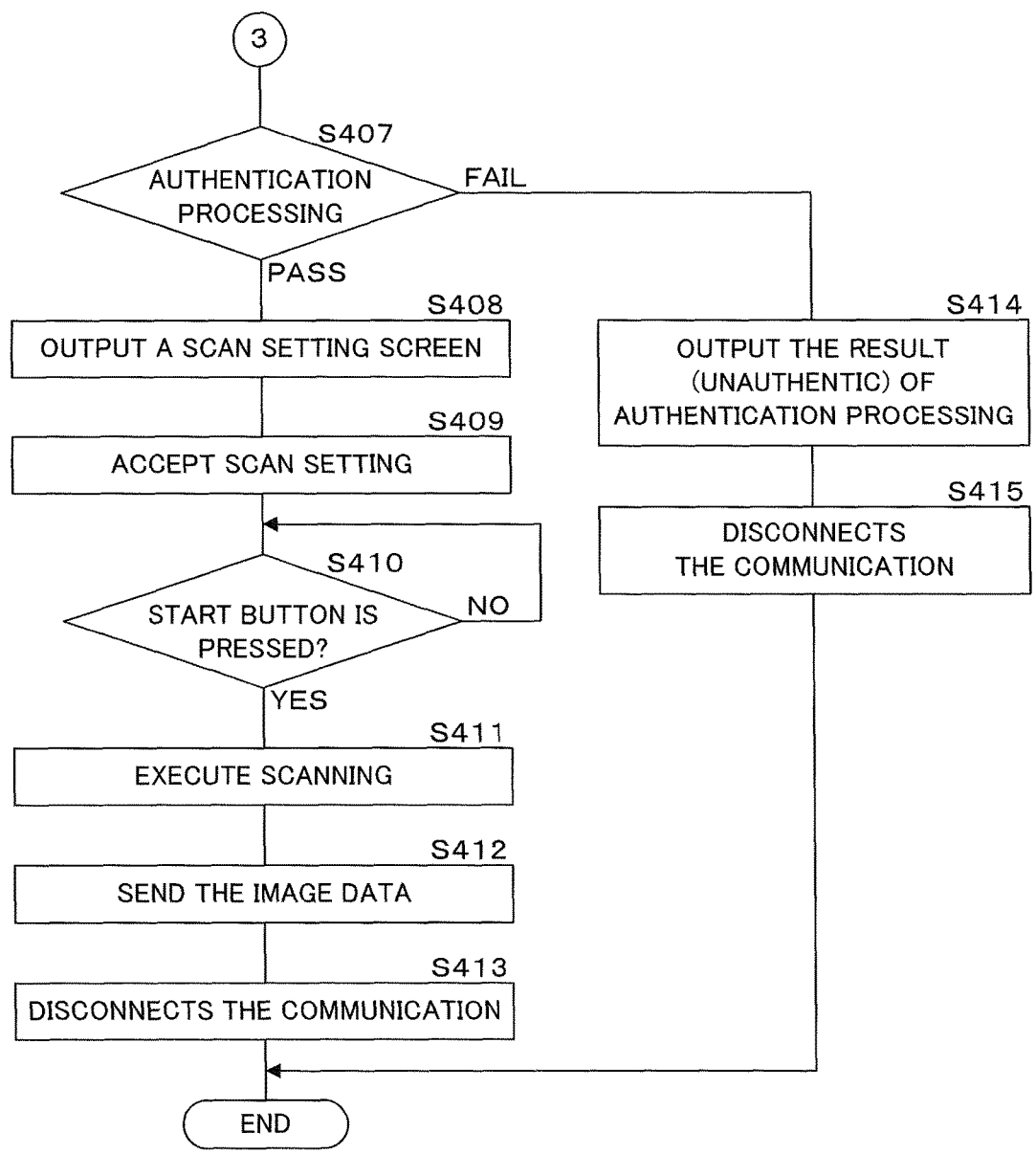
FIG. 11B is a flowchart illustrating an example of a processing procedure performed when an image sending service is executed in a multifunction machine according to Embodiment 3.

FIGS. 11A and 11B show a flowchart illustrating an example of a processing procedure performed when an image sending service is executed in the multifunction machine 1 according to Embodiment 3.

The control unit 10 determines whether or not image sending is selected on the initial screen displayed on the display unit 11a through the operation unit 11b, and whether or not a mobile phone is selected on the screen for selecting an image sending destination, that is, whether or not an instruction is provided to start a wireless scanning service (step S401). The image sending service for scanned image data to a mobile phone is hereinafter referred to as "wireless scanning service."

If it is determined that no instruction is provided to start the wireless scanning service (S401: NO), the control unit 10 returns the processing to step S401, and waits until the instruction is provided to start the wireless scanning service through the operation unit 11b.

If it is determined that the instruction is provided to start the wireless scanning service (S401: YES), the control unit 10 instructs the password generating unit 14 to generate a one-time password (step S402). The control unit 10 obtains the password generated by the password generating unit 14 (step S403), and reads out the SSID for the multifunction machine 1 itself from the memory 12 (step S404). The control unit 10 then outputs connection information (SSID and one-time password) for connecting to the multifunction machine 1 to be displayed on the display unit 11a (step S405).

The control unit 10 determines whether or not a connection is made from a communication terminal device 2 through the communication unit 13 (step S406). If it is determined that no connection is made (S406: NO), the control unit 10 returns the processing to step S406, and waits until it is determined that a connection is made.

It is noted that, at step S406, when a certain period of time has elapsed from the timing at which a password is generated (S402) while remaining unconnected, the processing may be terminated and connection with the password generated at step S402 may be disabled. Here, the display unit 11a is returned to the state where the screen for selecting an image sending destination is displayed thereon.

If it is determined, at step S406, that a connection is made from the communication terminal device 2 (S406: YES), the control unit 10 executes authentication processing based on the SSID and password sent at the time of connection, i.e. to determine whether or not the password is valid (step S407).

If it is recognized, as a result of the authentication processing, that the password is valid and authentic (S407: PASS), the control unit 10 outputs a scan setting screen to be displayed on the display unit 11a (step S408), and accepts scan setting (step S409). The control unit 10 then determines whether or not a start button for providing an instruction to start scanning is pressed (step S410). If it is determined that the start button is not pressed (S410: NO), the control unit 10 returns the processing to step S410 and waits until the start button is pressed.

When sensing that the start button is pressed (S410: YES), the control unit 10 executes scanning of a document based on the scan setting accepted at step S409 (step S411). The control unit 10 sends the image data obtained by scanning to the communication terminal device 2 (step S412), disconnects the communication with the communication terminal device 2 (step S413), and terminates the processing. Here, the display unit 11a is returned to the state where the screen for selecting an image sending destination is displayed thereon. The password generated at step S402 is invalidated at the time when the processing is terminated.

If it is determined that, as a result of the authentication processing at step S407, the password is invalid and unauthentic (S407: FAIL), the control unit 10 outputs the result of the authentication processing to the display unit 11a (step S414). The control unit 10 disconnects the communication (step S415), and terminates the processing. Here, the display unit 11a is returned to the state where the screen for selecting an image sending destination is displayed thereon. In such a case, the password generated at step S402 may be invalidated at the time when the processing is terminated, or the authentication processing may be accepted again. When the authentication processing is accepted again, it is desirable to set a limit for the time and the number of trials.

Note that, at step S407, the control unit 10 does not authenticate simultaneous connection from multiple communication terminal devices 2. When multiple communication terminal devices 2 try to connect with the same password, the control unit 10 determines that only the first communication terminal device 2 trying to connect the earliest is authentic.

Next, processing performed on the side of the user's communication terminal device 2 will be described. FIG. 12 is a flowchart illustrating an example of a processing procedure performed when a scan sending service is used at the communication terminal device 2 according to Embodiment 3. The control unit 20 reads out the print application in response to the user's operation, and the communication terminal device 2 executes the processing described below when receiving of scan data is selected.

The control unit 20 activates the communication unit 23 to enable wireless communication (step S501). The communication unit 23 searches for a target device for wireless communication (step S502), and outputs the list of SSIDs stored in the memory 22 and SSIDs for the target devices obtained by the search (step S503). The example of the screen on which the list is output is similar to the example illustrated in FIG. 8 according to Embodiment 1.

The control unit 20 accepts the selection of a device (multifunction machine 1) to be connected, from the output list (step S504). It is also possible to accept the user's input of SSID at step S503.

The control unit 20 outputs a password input screen for connecting to the selected multifunction machine 1, to be displayed on the display unit 21a (step S505), and obtains a password to be input by the user to the password input screen through the operation unit 21b (step S506). The password input screen is similar to the example illustrated in FIG. 9 according to Embodiment 1.

The control unit 20 tries to connect to the multifunction machine 1 through the communication unit 23 based on the password obtained at step S506 (step S507). The control unit 20 determines whether or not the connection succeeds (step S508), and if it is determined as unauthentic and the connection fails (S508: NO), terminates the processing.

If it is determined that the connection succeeds (S508: YES), the control unit 20 then determines whether or not receiving of image data to be sent from the multifunction machine 1 is started (step S509). If it is determined that receiving is not started (S509: NO), the control unit 20 returns the processing to step S509 and waits until receiving of image data is started. Here, the control unit 20 may make the display unit 21a display a message indicating that scan setting is conducted and scanning is started.

If it is determined that receiving of image data is started (S509: YES), the control unit 20 temporarily stores the received image data in sequence in the RAM of the memory 22 (step S510). The control unit 20 determines whether or not receiving of image data is completed (step S511), and if it is determined that receiving is not completed (S511: NO), returns the processing to step S510 to perform processing on the image data to be received next. It may be preferable for the display unit 21a to display an image, a message or the like indicating that data is being received, until it is determined that at step S511 receiving is completed.

If it is determined at step S511 that receiving is completed (S511: YES), the control unit 20 saves the image data that is temporarily and sequentially stored in a flash memory of the memory 22 (step S512), and terminates the processing.

After the processing is terminated, the multifunction machine 1 disconnects the connection, so that the communication terminal device 2 cannot send and receive image data to/from the multifunction machine 1.

The processing procedures shown in the flowchart of FIGS. 11A, 11B and 12 ensure the security of connection to the multifunction machine 1. Accordingly, even with the configuration in which the multifunction machine 1 is connected to an unspecified communication terminal device 2 to send scanned image data, the security therefor may also be ensured. The image sending service may safely be implemented by a simple operation by the user executing the operation for generating a password at the multifunction machine 1, inputting the generated password at the communication terminal device 2 and executing scanning.

Embodiments 1 to 3 described a configuration in which a one-time password is generated at the multifunction machine 1, and the user of the communication terminal device 2 inputs the password through the operation unit 21b. The present invention is, however, not limited to the above-described configuration, but may also employ other ways, such as obtaining a one-time password from a shared server. Furthermore, power supplied to the communication unit 13 in the multifunction machine 1 may be turned on/off at the timing of enablement/disablement of the wireless communication function. This allows power consumption to be lowered.

(Embodiment 4)

In Embodiments 1 to 3, the one-time password generated by the password generating unit 14 is used as connection information for a communication terminal device 2 to connect to the multifunction machine 1. In Embodiment 4, however, a password as the connection information used for connection serves as information unique to each multifunction machine and fixed information, while a one-time password is used for authentication in determining whether or not sending/receiving of image data is possible.

Figure 13:
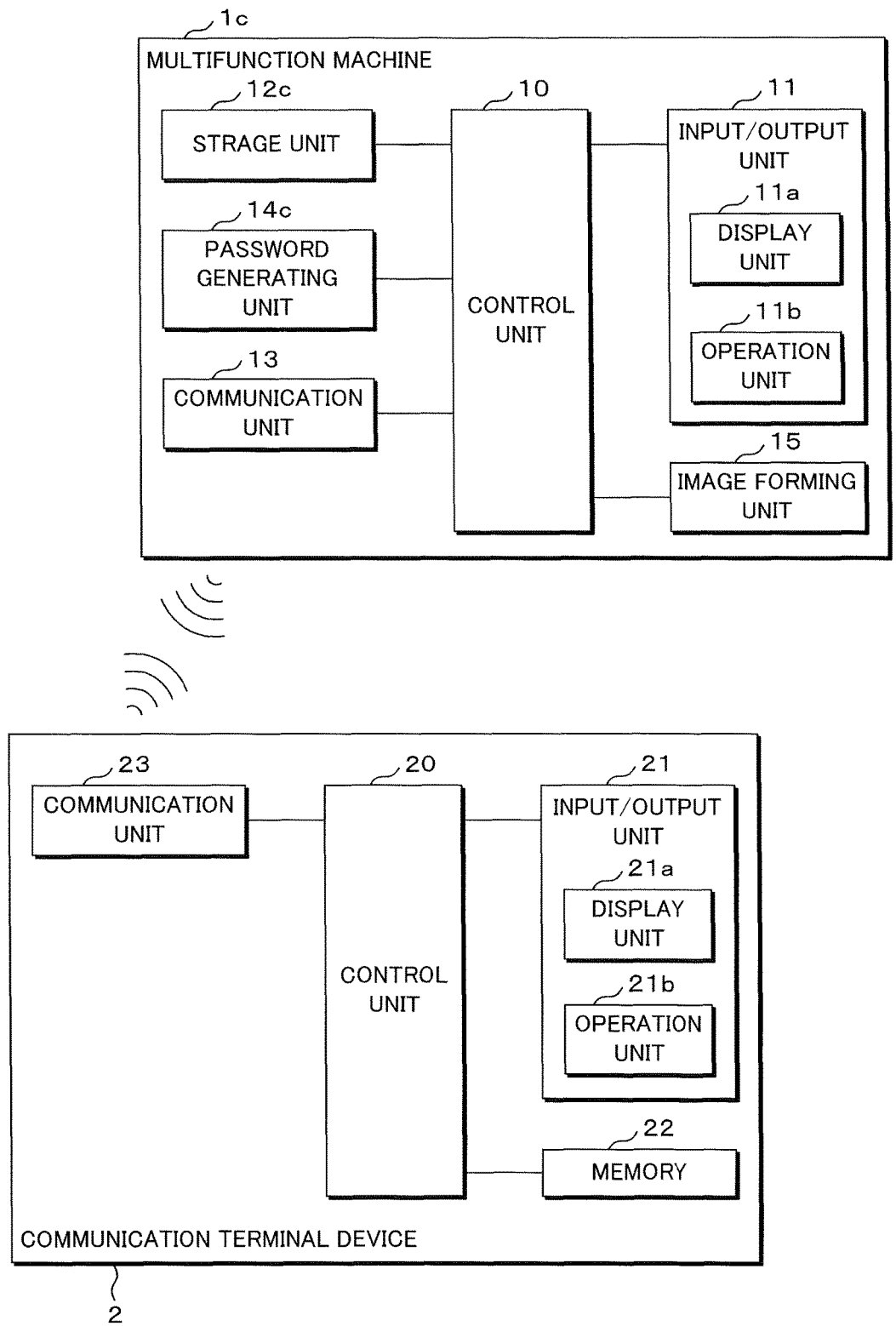
FIG. 13 is a block diagram illustrating a configuration of a printing service system according to Embodiment 4.

FIG. 13 is a block diagram illustrating a configuration of a printing service system according to Embodiment 4. The printing service system according to Embodiment 4 includes a multifunction machine 1c and a communication terminal device 2. The configuration of the printing service according to Embodiment 4 is similar to the configuration in Embodiment 1, except for the configurations of the memory 12c and password generating unit 14c in the multifunction machine 1c, and for detailed processing procedures performed between the multifunction machine 1c and communication terminal device 2. Accordingly, the configuration units common to those in Embodiment 1 are denoted by the same reference codes and will not be described in detail.

The multifunction machine 1c according to Embodiment 4 includes a control unit 10, an input/output unit 11, a memory 12c, a communication unit 13, a password generating unit 14c and an image forming unit 15.

The memory 12c uses an HDD or SSD. In the memory 12c, SSID for the multifunction machine 1c as well as a predetermined password (eight-digit alphabet characters, for example) is stored for communication connection to the multifunction machine 1c. The SSID for the memory 12c and the predetermined password can be read out by the control unit 10. The memory 12*c* may store the image data received from the communication terminal device 2.

The password generating unit 14*c* generates a one-time password for receiving image data based on the instruction from the control unit 10. The password generating unit 14*c* generates a one-time password by a method of, for example, creating four-digit numbers based on randomly generated numbers. The method of generating a one-time password is not limited to the one described here, but may be realized by various ways including known methods.

The procedure performed in the image processing system according to Embodiment 4 configured as described above, in which image data is sent from the communication terminal device 2 to the multifunction machine 1*c* where printing-out is performed, will now be described with reference to the flowchart and examples of operation screens.

Figure 14A:
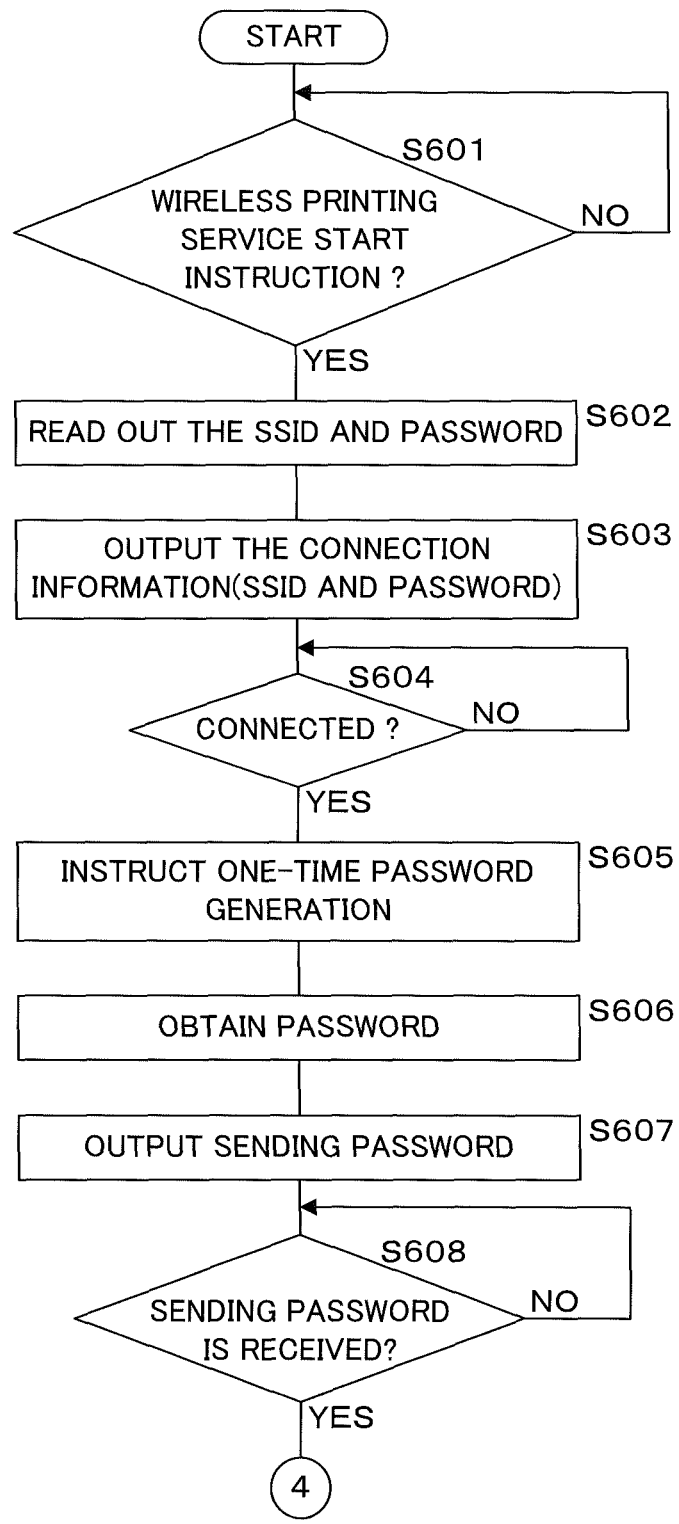
FIG. 14A is a flowchart illustrating an example of a processing procedure performed when a printing service is executed at a multifunction machine according to Embodiment 4.
Figure 14B:
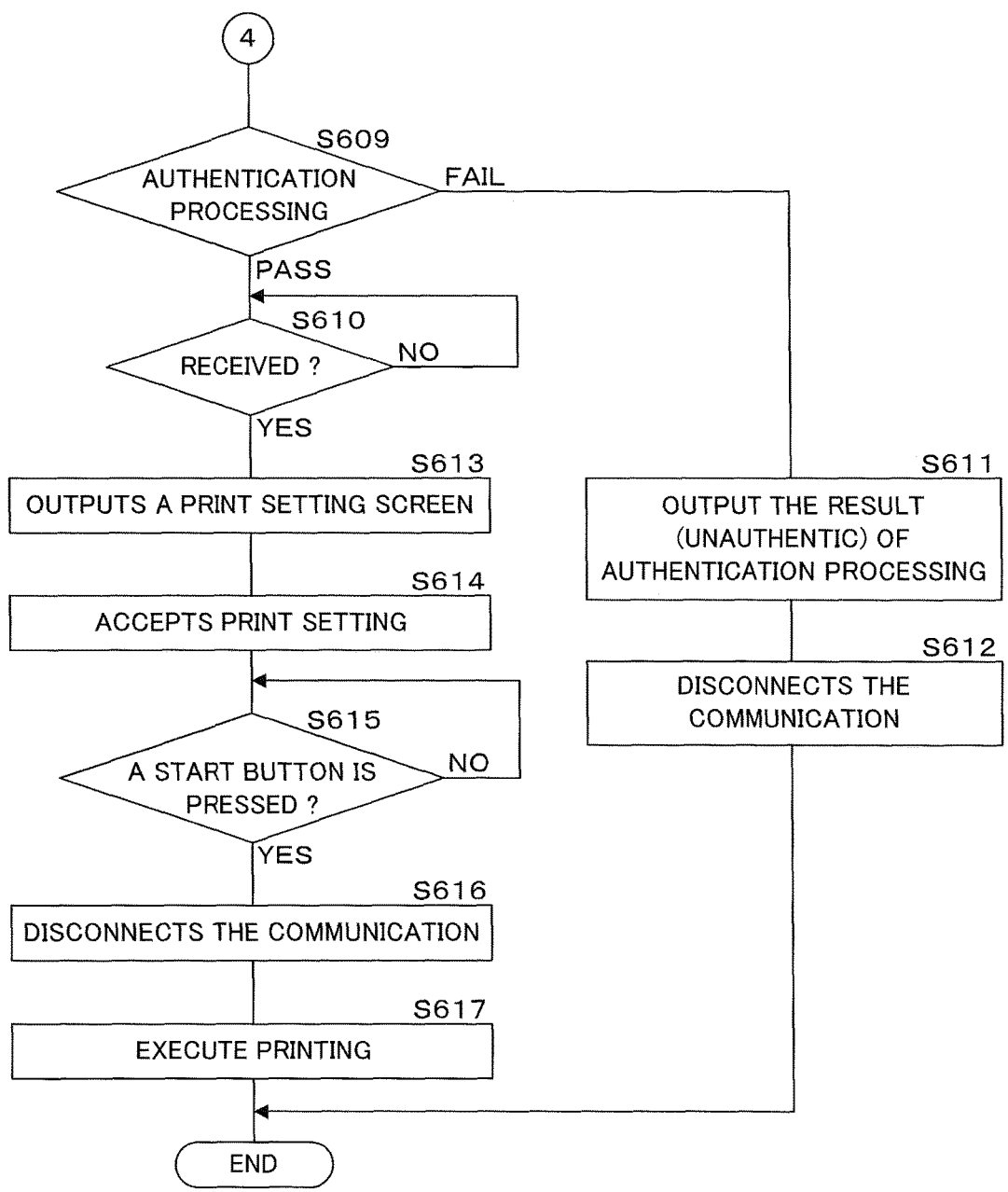
FIG. 14B is a flowchart illustrating an example of a processing procedure performed when a printing service is executed at a multifunction machine according to Embodiment 4.

FIGS. 14A and 14B show a flowchart illustrating an example of a processing procedure performed when a printing service is executed at the multifunction machine 1*c* according to Embodiment 4. The processing procedure described below corresponds to the processing procedure performed in the communication terminal device 2 shown in the flowchart of FIGS. 17A and 17B, which will be described later. The multifunction machine 1*c* executes the processing described below while being in a waiting state where the initial screen is displayed on the display unit 11*a* and the wireless communication function through the communication unit 13 is enabled.

The control unit 10 determines whether or not an instruction is provided to start the wireless printing service (step S601). It is noted that, in S601, the control unit 10 may determine that the instruction is provided to start the wireless printing service by the procedure similar to that in Embodiment 1. In other words, if the user touches the touch panel on the icon 110 indicating "photograph printing service" on the initial screen as shown in the example of FIG. 4, and further touches the touch panel on the icon 130 for selecting "mobile phone with wireless communication function" on the storage medium selecting screen as shown in the example of FIG. 5, the control unit 10 determines that an instruction is provided to start the wireless printing service.

If it is determined that no instructions are provided to start the wireless printing service (S601: NO), the control unit 10 returns the processing to step S601.

If it is determined that the instruction to start the wireless printing service is provided (S601: YES), the control unit 10 reads out the SSID and predetermined password stored in the memory 12*c* (step S602), and outputs the read-out SSID and predetermined password to the display unit 11*a* as connection information (step S603).

Figure 15:
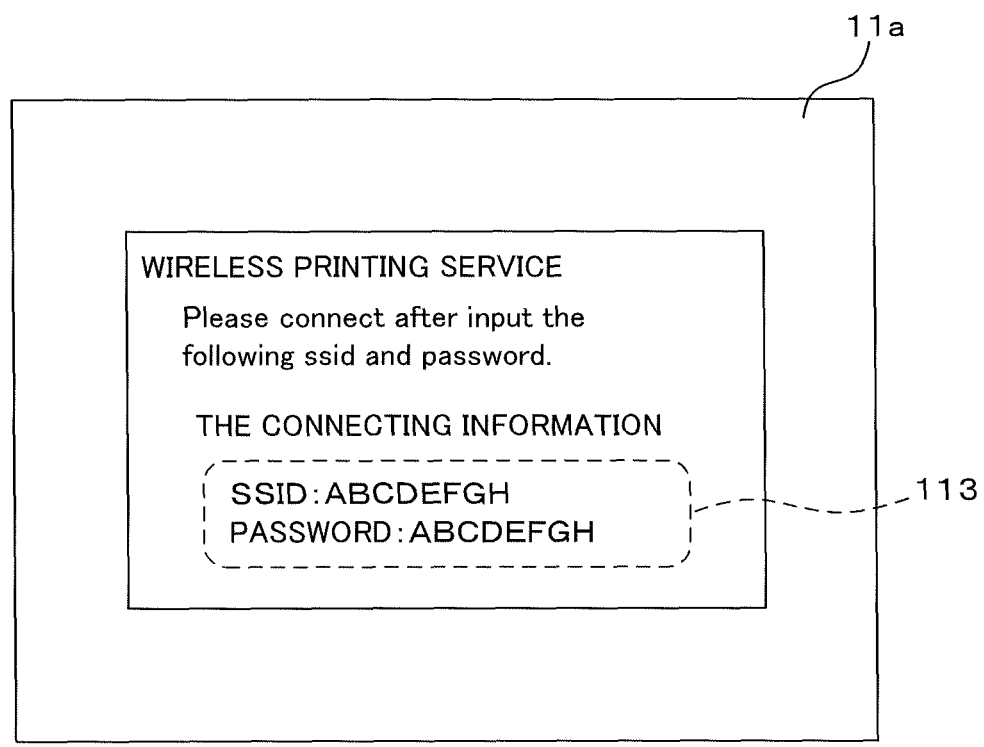
FIG. 15 is an explanatory view illustrating an example of connection information displayed at a display unit of a multifunction machine according to Embodiment 4.

FIG. 15 is an explanatory view illustrating an example of connection information displayed at the display unit 11*a* of the multifunction machine 1*c* according to Embodiment 4. As illustrated in FIG. 15, by the control of the control unit 10, for example, alphabet characters of "ABCDEFGH" are shown for the SSID while "ABCDEFGH," which is the same as the SSID, are likewise shown for the predetermined password in a connection information display area 113. The user can recognize such information by viewing the connection information display area 113. It is to be understood that the SSID and password in FIG. 15 are exemplary and other alphanumeric characters or symbols may also be used.

Description continues with reference to FIG. 14A again.

Next, the control unit 10 determines whether or not a connection is made from the communication terminal device 2 (step S604). If it is determined that no connection is made (S604: NO), the control unit 10 returns the processing to step S604, and waits until a connection is made.

If it is determined at step S604 that a connection is made from the communication terminal device 2 (S604: YES), the control unit 10 instructs the password generating unit 14*c* to generate a one-time password (step S605). The control unit 10 obtains a password generated by the password generating unit 14*c* (step S606), and outputs a sending password for receiving image data, i.e. sending image data from the communication terminal device 2, to be displayed on the display unit 11*a* (step S607).

Figure 16:
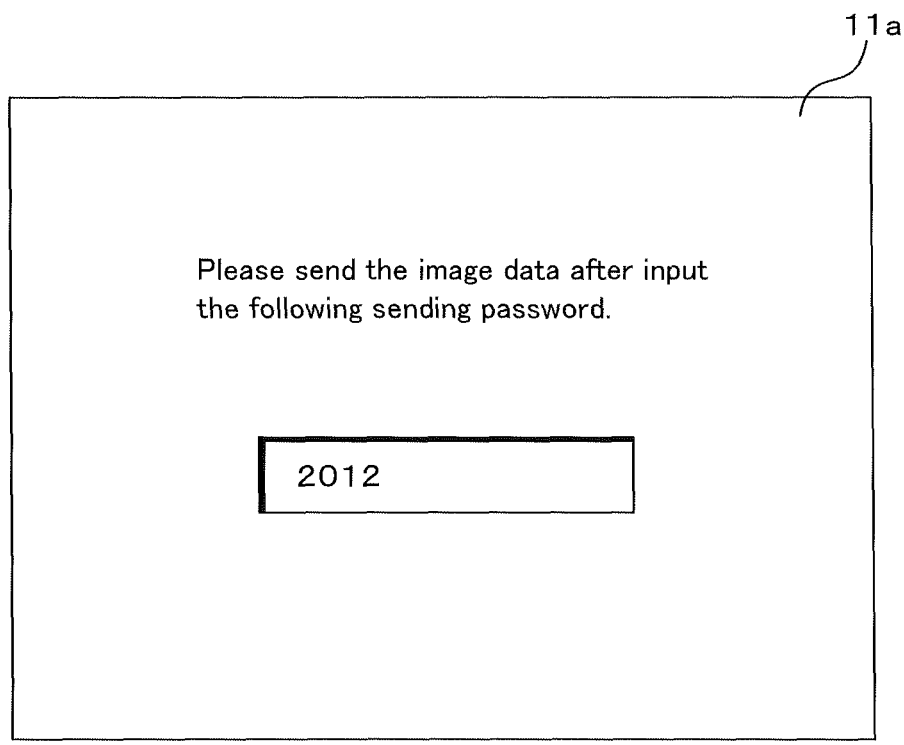
FIG. 16 is an explanatory view illustrating an example of a sending password displayed on a display unit of a multifunction machine according to Embodiment 4.

FIG. 16 is an explanatory view illustrating an example of a sending password displayed on the display unit 11*a* of the multifunction machine 1*c* according to Embodiment 4. As illustrated in FIG. 16, the control unit 10 performs such control that four-digit numbers of "2012," for example, is displayed. The user views the display unit 11*a* to recognize a sending password. It is to be understood that the sending password shown in FIG. 16 is exemplary, and other alphanumeric characters, symbols or the like may also be used.

Description continues with reference to FIG. 14A again.

The control unit 10 determines whether or not a sending password is received from the communication terminal device 2 (step S608). If it is determined that no sending password is received (S608: NO), the control unit 10 returns the processing to step S608, and waits until it is determined that a sending password is received.

Note that, if a certain time period (two minutes, for example) elapses without receiving a sending password after the sending password is output at step S607, the processing is terminated, and the sending of image data with the password generated at step S605 may thereafter be rejected as unauthentic. Here, the display unit 11*a* is returned to the state where the storage medium selecting screen as shown in FIG. 5 is displayed, as in the case with Embodiment 1.

If it is determined at step S608 that a sending password is received (S608: YES), the control unit 10 executes authentication processing to determine whether or not the sending password is valid (step S609). If it is recognized that the sending password is valid and authentic as a result of authentication processing (S609: PASS), the control unit 10 determines whether or not image data is received (step S610). If it is determined that no image data is received (S610: NO), the control unit 10 returns the processing to step S610 and waits until it is determined that the image data is received. If it is determined that the sending password is invalid and unauthentic as a result of authentication processing at step S609 (S609: FAIL), the result of authentication processing is sent to the communication terminal device 2 (step S611), disconnects the communication (step S612) and terminates the processing. Here, the display unit 11*a* is returned to the state where the storage medium selecting screen shown in FIG. 5 is displayed, as in the case with Embodiment 1. In such a case, the password generated at step S605 may be invalidated at the time when the processing is terminated, or authentication processing may be accepted once again. In the case where the authentication processing is accepted again, it is preferable to limit the time and the number of trials.

If it is determined at step S610 that image data is received (S610: YES), the control unit 10 outputs a print setting screen to be displayed on the display unit 11*a* (step S613), and accepts print setting (step S614). Subsequently, the control unit 10 determines whether or not a start button for providing an instruction to start printing-out is pressed (step S615). If it is determined that the start button is not pressed (S615: NO), the control unit 10 returns the processing to step S615 to wait until the button is pressed. If it is determined that the start button is pressed (S615: YES), the control unit 10 disconnects the communication with the communication terminal device 2 before the next printing-out processing is started (step S616), sends the print setting accepted at step S614 as well as the image data received at step S610 to the image forming unit 15, executes printing-out (step S617), and terminates the processing.

It is not always necessary to disconnect communication in the processing at step S616, but is possible to validate the connection with the communication terminal device 2 only until the printing-out processing at step S617 is started, and to reject the connection if re-tried. It is also possible to disconnect the communication at the side of the multifunction machine 1 not only before printing-out is started but immediately after printing-out is completed, or to reject receiving of image data using a password generated at step S605 from the communication terminal device 2 after printing-out is completed. In other words, the generated sending password is made valid only for a period until sending/receiving of image data to/from the communication terminal device 2 is completed.

Furthermore, the processing at steps S613 to S615 may be skipped and printing-out may automatically be started based on the setting sent together with the image data.

Figure 17A:
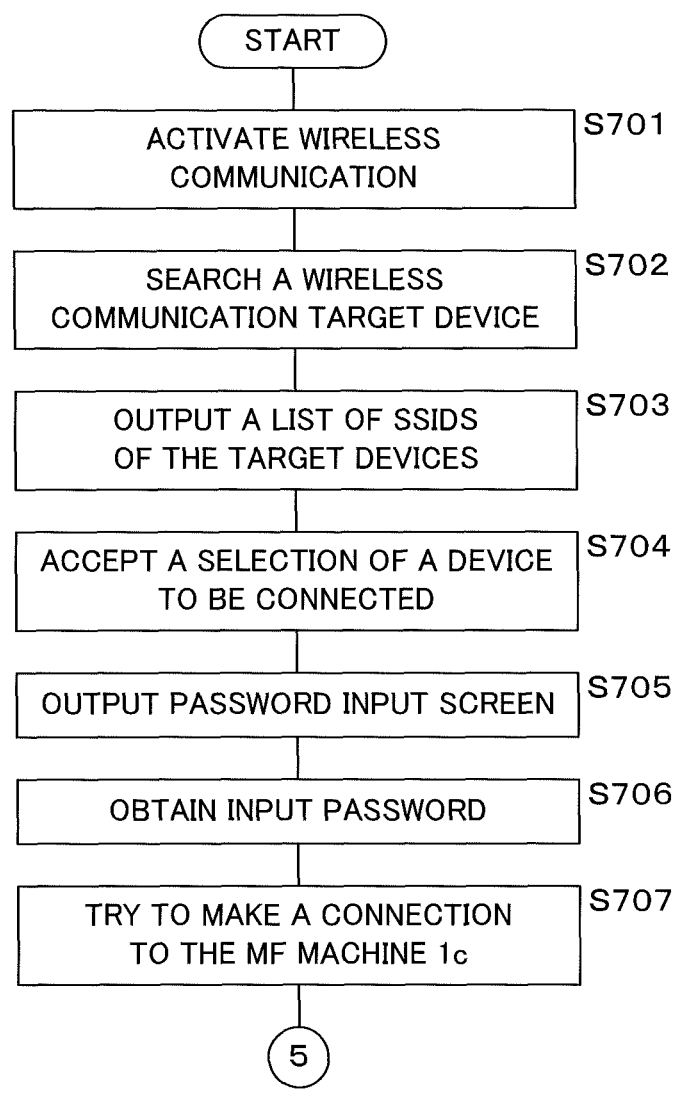
FIG. 17A is a flowchart illustrating an example of a processing procedure performed when a printing service is used at a communication terminal device according to Embodiment 4.
Figure 17B:
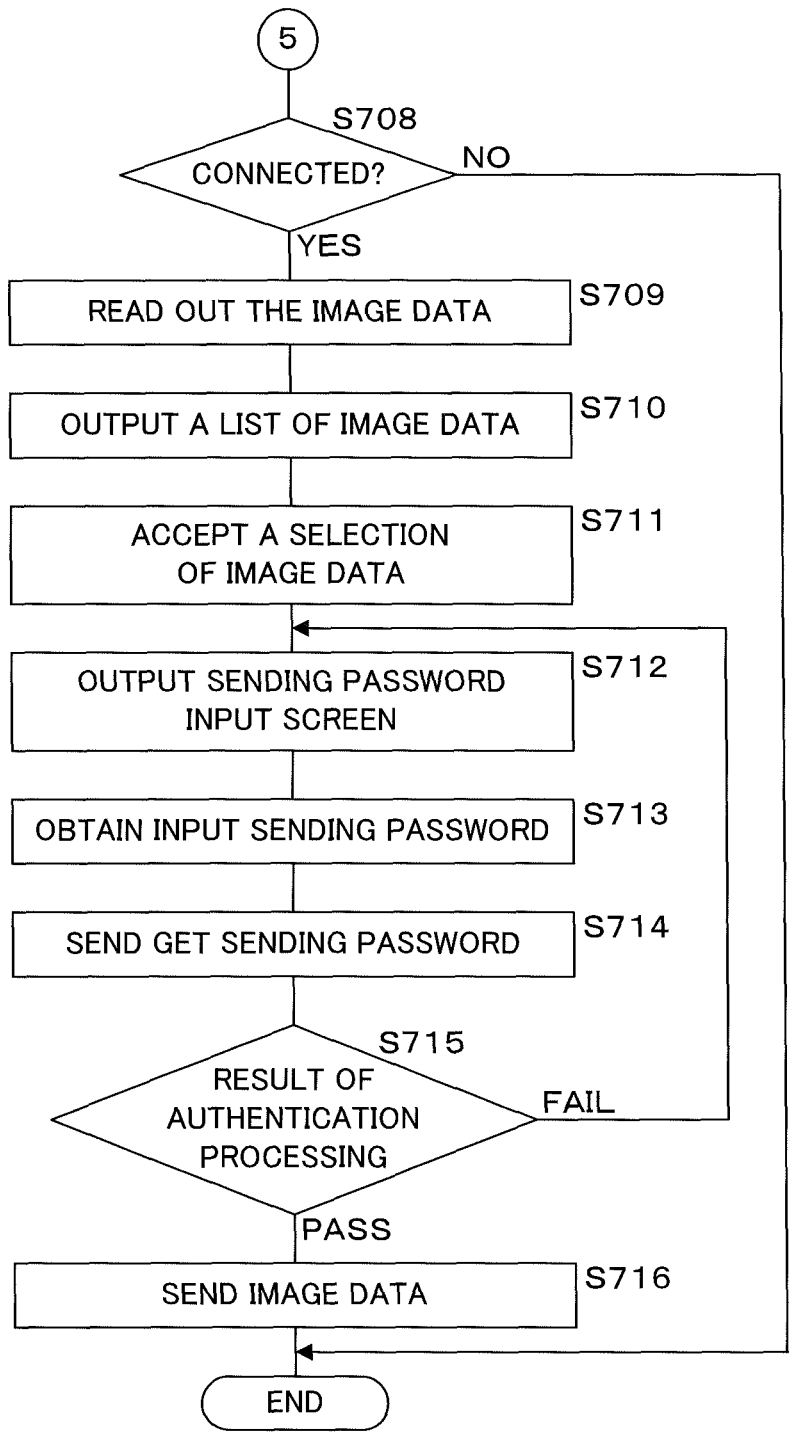
FIG. 17B is a flowchart illustrating an example of a processing procedure performed when a printing service is used at a communication terminal device according to Embodiment 4.

Next, the processing performed in the communication terminal device 2 which corresponds to the flowchart in FIGS. 14A and 14B will be described. FIGS. 17A and 17B show a flowchart illustrating an example of a processing procedure performed when a printing service is used at the communication terminal device 2 according to Embodiment 4. In the case where the control unit 20 reads out and executes a print application in response to the user's operation, the communication terminal device 2 executes the processing described below.

The control unit 20 activates the communication unit 23 to enable wireless communication (step S701). The communication unit 23 searches for a target device for wireless communication (step S702), and outputs the list of SSIDs stored in the memory 22 and SSIDs for the target devices obtained by the search (step S703). The control unit 20 accepts the selection of a device to be connected, from the output list (step S704). It is noted that, at step S703, the user's input of SSID may also be accepted.

The control unit 20 outputs a password input screen for connecting to the device selected at step S704, to be displayed on the display unit 21a (step S705). When there is a history for connection to the selected device, the control unit 20 may have a password corresponding to the SSID for that device stored in the memory 22. Here, the control unit 20 may initially display the stored password on the password input screen in advance. The control unit 20 obtains the password input by the user on the password input screen or the already-input password (step S706).

The control unit 20 tries to connect to the multifunction machine 1c through the communication unit 23 based on the SSID and password obtained at step S706 (step S707). The control unit 20 determines whether or not the connection succeeds (step S708), and if it is determined that the connection fails (S708: NO), terminates the processing. If it is determined that the connection succeeds at step S708 (S708: YES), the control unit 20 reads out image data to be printed, which is stored in the flash memory in the memory 22 (step S709), and outputs the list of data to be displayed on the display unit 21a (step S710). The control unit 20 accepts the selection of one or more pieces of image data from the list of the displayed image data (step S711).

Next, the control unit 20 outputs an input screen for a sending password for sending selected image data, to be displayed on the display unit 21a (step S712), and obtains a sending password input by the user on the password input screen through the operation unit 21b (step S713).

Figure 18:
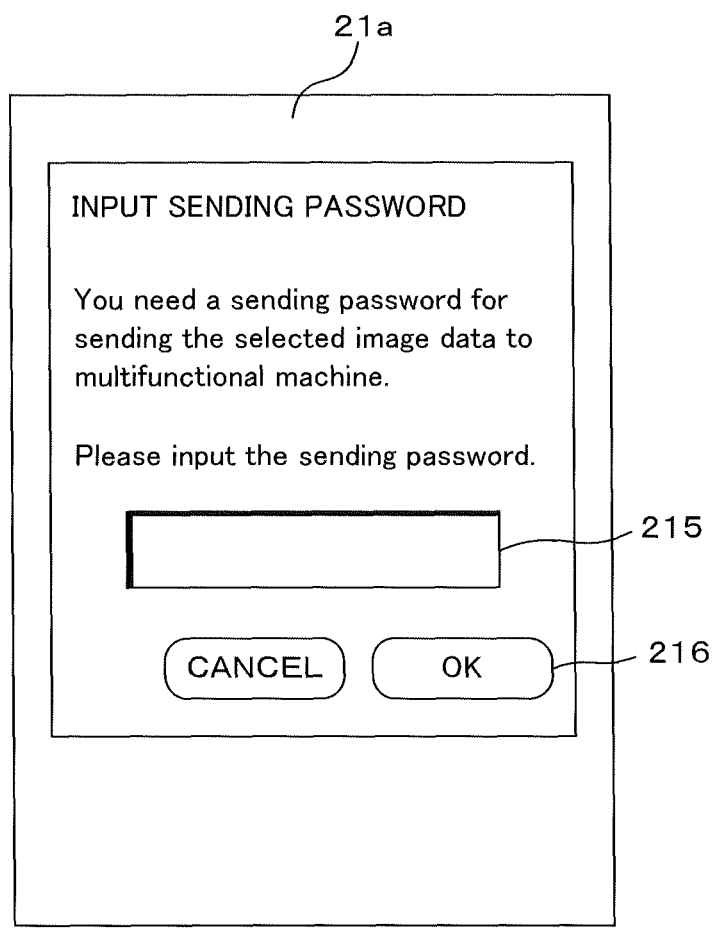
FIG. 18 is an explanatory view illustrating an example of a password input screen displayed on a display unit at a communication terminal device according to Embodiment 4.

FIG. 18 is an explanatory view illustrating an example of a password input screen displayed on a display unit 21a at a communication terminal device 2 according to Embodiment 4. In the example of FIG. 18, an acceptance unit 215 for accepting the input of a password is shown. The user views a one-time password output to the display unit 11a at step S607 in the flowchart of FIG. 14A in the multifunction machine 1c, inputs the password to the acceptance part 215 and touches the touch panel on the "OK" icon 216. This allows the communication terminal device 2 to obtain a sending password.

Description continues with reference to the flowchart of FIG. 17B again.

The control part 20 sends the sending password obtained at step S713 to the multifunction machine 1c, which is being connected, through the communication unit 23 (step S714), receives an authentication result based on the sent sending password, and determines whether or not the received authentication result is a success (step S715). If it is determined that the authentication result is a failure (S715: FAIL), the control unit 20 returns the processing to step S712 so as to accept re-input of authentic sending data.

If it is determined that the authentication result is a success (S715: PASS), the control unit 20 sends the image data for which the selection is accepted at step S711 to the multifunction machine 1c, which is being connected, through the communication unit 23 (step S716), and terminates the processing.

After step S716, the multifunction machine 1c disconnects the connection so that the communication terminal device 2 cannot send/receive image data to/from the multifunction machine 1c, or send the image data unless it newly obtains a sending password.

The processing procedures shown in the flowcharts in FIGS. 14A, 14B, 17A and 17B ensure the security for image data sending to the multifunction machine 1c. As the password generated at step S605 is a one-time password while connection is limited by, for example, disconnecting communication at a timing before or after printing-out at step S616, image data sent thereafter from the communication terminal device 2 using the same sending password would not be received by the control unit 10 in the multifunction machine 1c. This ensures the security even for a configuration in which a connection is made to an unspecified communication terminal device 2 for printing-out. It is thus possible to easily connect to the multifunction machine 1c again based on the SSID and password saved in the memory 22 once a connection is established with the multifunction machine 1c, while the security for image data may be ensured with a sending password which is a one-time password. A simple operation of selecting image data to be printed and inputting a sending password allows a printing service to be securely implemented.

It is to be understood that the screen examples illustrated in FIGS. 15, 16 and 18 are mere examples and may be realized by other screen structures.

It should be noted that the embodiments disclosed herein are illustrative and not restrictive in all aspects. The present invention is defined by the appended claims rather than by the description preceding them, and all changes that fall within metes and bounds of the claims, or equivalence of such metes and bounds thereof are therefore intended to be embraced by the claims.

What is claimed is:

1. An information processing device comprising:
a display unit;
an operation unit; and
a processor for executing a process of:
  outputting an initial screen to be displayed by the display unit, the initial screen accepting an operation by the operation unit for activating a scanning function;
  generating a password corresponding to SSID;
  outputting the password and SSID to be displayed by the display unit after the password is generated;
  activating the scanning function in the initial screen;
  connecting to an external device through wireless communication by using the password and the SSID after the scanning function is activated, whereby the connecting would occur after the password and the SSID are output;
  outputting a scan setting screen to be displayed by the display unit after a connection with the external device in the case that the scanning function is activated in the initial screen;
  accepting an instruction to start scanning after a scan setting is accepted;
  accepting confirmation of scan setting with the operation unit;
  determining whether the instruction to start scanning is provided or not by the operation unit;
  executing scanning based on the scan setting accepted if it is determined an instruction is provided;
  sending an image data obtained by scanning to the external device;
  disconnecting from the external device after sending; and
  disabling a wireless communication after completion of sending the image.

2. The information processing device according to claim 1, wherein
the processor causes the display unit to display user-interface for accepting selection of a function to send the image data to the external device, and outputs the scan setting screen if the function is selected at the user-interface.

3. The information processing device according to claim 1, wherein
the processor disables the password when a wireless communication is disconnected, and generates a new password different from the disabled password.

4. A method of processing in an information processing device having a display unit, an operating unit; a communication unit and a processor, the method comprising the steps of:
  the processor outputting an initial screen to be displayed by the display unit, the initial screen accepting an operation by the operation unit for activating a scanning function;
  the processor generating a password corresponding to SSID;
  the display unit displaying the password and the SSID after the password is generated;
  the processor activating the scanning function in the initial screen;
  the processor connects to an external device through wireless communication by using the password and the SS ID via the communication unit after the scanning function is activated, whereby the connecting would occur after the password and the SSID are displayed;
  the processor outputting a scan setting screen to be displayed by the display unit after a connection with the external device in the case that the scanning function is activated in the initial screen;
  the processor accepting an instruction to start scanning after a scan setting is accepted;
  the processor accepting confirmation of scan setting with operation unit;
  the processor determining whether the instruction to start scanning is provided or not by the operation unit;
  the processor executing scanning based on the scan setting accepted if it is determined the instruction is provided;
  the processor sending an image data obtained by scanning to the external device;
  the processor disconnecting from the external device after sending; and
  the processor disabling a wireless communication after completion of sending the image.

5. An information processing device comprising:
a display unit; and
a processor configured to:
  output an initial screen to the display unit, the initial screen including a scanning function portion configured to initiate a scanning function;
  generate a one-time password corresponding to an SS ID of the information processing device;
  output the one-time password and the SSID to the display unit after the one-time password is generated;
  activate the scanning function in the initial screen;
  wirelessly connect with only a single external device by receiving the one-time password from the external device in connection with the SSID, wherein the wirelessly connecting would occur the scanning function is activated, and whereby the wirelessly connecting would occur after the one-time password and the SSID are output;
  output a scan setting screen to the display unit in response to both the wirelessly connecting to the external device and the scanning function being activated in the initial screen;
  accept an instruction to initiate scanning, based on the scan setting, from a user-interface;
  initiate scanning in response to receipt of user input to the user-interface, the scanning being based on the scan setting;
  send image data obtained by the scanning to only the external device via the wireless connection;
  disconnect from the external device after sending; and
  disable a wireless communication after completion of sending image.

* * * * *